US009056955B2

(12) United States Patent
Mizumori et al.

(10) Patent No.: US 9,056,955 B2
(45) Date of Patent: Jun. 16, 2015

(54) RESIN PARTICLE COMPRISING MICROPARTICLE MADE OF A CRYSTALLINE RESIN, AND METHOD FOR PRODUCING THE SAME

(75) Inventors: Masahide Mizumori, Kyoto (JP); Yasuhiro Shindo, Kyoto (JP)

(73) Assignee: SANYO CHEMICAL INDUSTRIES, LTD., Kyoto-shi (JP)

( * ) Notice: Subject to any disclaimer, the term of this patent is extended or adjusted under 35 U.S.C. 154(b) by 536 days.

(21) Appl. No.: 12/922,825

(22) PCT Filed: Mar. 23, 2009

(86) PCT No.: PCT/JP2009/001260
§ 371 (c)(1),
(2), (4) Date: Sep. 15, 2010

(87) PCT Pub. No.: WO2009/119055
PCT Pub. Date: Oct. 1, 2009

(65) Prior Publication Data
US 2011/0020741 A1    Jan. 27, 2011

(30) Foreign Application Priority Data

Mar. 24, 2008 (JP) .................................. 2008-075469
Oct. 31, 2008 (JP) .................................. 2008-280832

(51) Int. Cl.
*B32B 5/16* (2006.01)
*G03G 9/093* (2006.01)
(Continued)

(52) U.S. Cl.
CPC ............... *C08J 3/12* (2013.01); *G03G 9/0804* (2013.01); *G03G 9/0819* (2013.01); *G03G 9/08795* (2013.01); *G03G 9/08797* (2013.01); *C08J 2367/02* (2013.01)

(58) Field of Classification Search
USPC ..................... 428/403, 407; 430/109.4, 110.2
See application file for complete search history.

(56) References Cited

U.S. PATENT DOCUMENTS 3,967,962 A * 7/1976 O'Malley ................. 430/123.52
5,412,027 A * 5/1995 Shine et al. ..................... 525/63
(Continued)

FOREIGN PATENT DOCUMENTS

JP         08-120111 A        5/1996
JP       2002-341586 A    * 11/2002
(Continued)

OTHER PUBLICATIONS

Machine translation JP 2007-277511 (2007).*
(Continued)

*Primary Examiner* — Holly Le
(74) *Attorney, Agent, or Firm* — Westerman, Hattori, Daniels & Adrian, LLP

(57) ABSTRACT

A resin particle having a sufficiently narrow particle size distribution obtainable by using a supercritical fluid, and a production method for obtaining a resin particle having a sufficiently narrow particle size distribution by using a supercritical fluid are provided. The present invention provides a resin particle (C) having a microparticle (A) fixed to or formed as a film on a surface of a resin particle (B) containing a resin (b), wherein the degree of swelling of the microparticle (A) by liquid or supercritical carbon dioxide (X) at a temperature lower than the glass transition temperature or the melting point of the microparticle (A) is 16% or less, and the microparticle (A) is at least one kind selected from the group consisting of a crystalline resin (a1), a noncrystalline resin (a2), and an inorganic compound (a3).

18 Claims, 1 Drawing Sheet

(51) Int. Cl.
    *G03G 9/113*    (2006.01)
    *C08J 3/12*     (2006.01)
    *G03G 9/08*     (2006.01)
    *G03G 9/087*    (2006.01)

(56) References Cited

U.S. PATENT DOCUMENTS

| | | | |
|---|---|---|---|
| 5,851,453 | A | 12/1998 | Hanna et al. |
| 7,718,339 | B2 | 5/2010 | Tomita et al. |
| 8,362,198 | B2 * | 1/2013 | Shindo et al. ............ 528/480 |
| 2006/0115758 | A1 * | 6/2006 | Chang et al. ............ 430/109.4 |
| 2009/0011356 | A1 | 1/2009 | Tomita et al. |
| 2011/0144287 | A1 * | 6/2011 | Shindo et al. ............ 525/437 |
| 2013/0071665 | A1 * | 3/2013 | Harada et al. ............ 428/405 |

FOREIGN PATENT DOCUMENTS

| | | | |
|---|---|---|---|
| JP | 2003-057875 A | 2/2003 |
| JP | 2004-151709 A | 5/2004 |
| JP | 2004-302458 A | 10/2004 |
| JP | 2005-99085 A | 4/2005 |
| JP | 2005-107405 A | 4/2005 |
| JP | 2005-164800 A | 6/2005 |
| JP | 2006-077219 A | 3/2006 |
| JP | 2006-84953 A | 3/2006 |
| JP | 2006-321830 A | 11/2006 |
| JP | 2007-193069 A | 8/2007 |
| JP | 2007-277511 A | 10/2007 |
| JP | 2008-287088 A | 11/2008 |
| JP | 2009-052005 A | 3/2009 |
| WO | 95/01221 A1 | 1/1995 |
| WO | 97/31691 A1 | 9/1997 |
| WO | 2007/105737 A1 | 9/2007 |

OTHER PUBLICATIONS

International Search Report of PCT/JP2009/001260, mailing date Jun. 9, 2009.
Japanese Notice of Reasons of Refusal mailed Aug. 19, 2014, corresponding to Japanese Office Action No. 2014-011718 (5 pages).

* cited by examiner

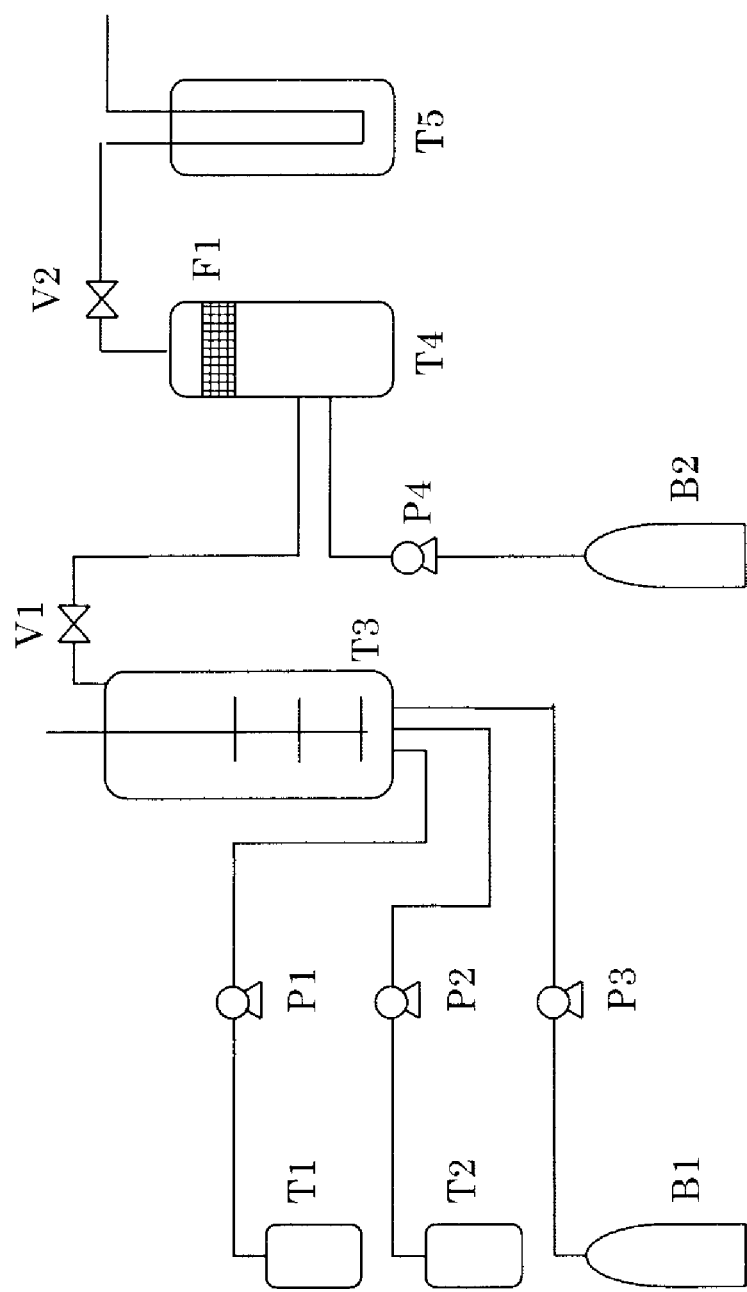

RESIN PARTICLE COMPRISING MICROPARTICLE MADE OF A CRYSTALLINE RESIN, AND METHOD FOR PRODUCING THE SAME

TECHNICAL FIELD

The present invention relates to resin particles having a narrow particle size distribution, and a method for producing the resin particles using a liquid or supercritical fluid.

BACKGROUND ART

Conventionally, as a method of forming particles in a non-aqueous medium, there are known a method of spraying a resin solution into a supercritical fluid (see Patent Documents 1 and 2, for example), a method of mechanically dispersing a heat-molten resin in a supercritical fluid in the presence of a microparticle dispersing agent such as an organic pigment or silicon oxide to form a microparticle of the resin, followed by pressure reduction to obtain a resin particle (see Patent Document 3, for example), and a method of mechanically dispersing a resin solution in a supercritical fluid in the presence of a microparticle dispersing agent and an activator to form a microparticle of the resin, followed by pressure reduction to obtain a resin particle (see Patent Documents 4 and 5, for example).

Patent Document 1: WO97/31691 pamphlet
Patent Document 2: WO95/01221 pamphlet
Patent Document 3: Japanese Patent Application Laid-Open (JP-A) No. 2005-107405
Patent Document 4: JP-A No. 2006-321830
Patent Document 5: JP-A No. 2007-277511

DISCLOSURE OF INVENTION

Problems to be Solved by the Invention

According to the method of spraying a resin solution into a supercritical fluid as described above, since a hydrophilic component is not required and a surface-active substance does not remain in or on a surface of a resin particle, it is possible to obtain a particle that is excellent in powder characteristics, electric characteristics and the like, but there is a problem that a sharp particle size distribution is difficult to be obtained. According to the method of dispersing a heat-molten resin in a supercritical fluid as described above, while it is believed that a particle having excellent powder characteristics and electric characteristics, and a narrow particle size distribution can be obtained, the particle size distribution of particles cannot be regarded as being sufficiently narrow from the practical viewpoint. Also in the techniques disclosed in the above documents, since a surface of a resin particle is covered with an organic pigment, silicon oxide or the like, there is a problem that the low temperature fixing property was poor when it was used as a resin particle for electrophotographic toner. According to the method of dispersing a resin solution in a supercritical fluid in the presence of a microparticle dispersing agent and an activator as described above, resin particles aggregate, and thus it was difficult to obtain particles having a narrow particle size distribution.

It is an object of the present invention to find out resin particles having a sufficiently narrow particle size distribution obtainable by using a liquid or supercritical fluid, and to provide a method for producing resin particles having a sufficiently narrow particle size distribution using a liquid or supercritical fluid.

Solution to the Problems

The present invention was made in view of the above circumstances in the conventional art. That is, the present invention includes the following six aspects.

(I) A resin particle (C) including a microparticle (A) fixed to or formed as a film on a surface of a resin particle (B) containing a resin (b), wherein the degree of swelling of the microparticle (A) by liquid or supercritical carbon dioxide (X) at a temperature lower than the glass transition temperature or the melting point of the microparticle (A) is 16% or less, and the microparticle (A) is at least one kind selected from the group consisting of a crystalline resin (a1), a non-crystalline resin (a2), and an inorganic compound (a3).

(II) A resin particle for electrophotographic toner containing the resin particle of (I).

(III) An electrophotographic toner containing the resin particle for electrophotographic toner of (II).

(IV) A method for producing the resin particle of (I), including the steps of: forming a resin particle (C) in which a microparticle (A) is fixed to a surface of a resin particle (B) containing a resin (b) by dispersing a precursor (b0) of the resin (b) in liquid or supercritical carbon dioxide (X) in which the microparticle (A) is dispersed, and allowing the precursor (b0) to react, and obtaining the resin particle (C) by removing the liquid or supercritical carbon dioxide (X).

(V) A method for producing the resin particle of (I), including the steps of: forming a resin particle (C1) in which a microparticle (A) is fixed to a surface of a resin particle (B1) containing a resin (b) and a solvent (S) by dispersing a solution (L) dissolving the resin (b) in the solvent (S), in liquid or supercritical carbon dioxide (X) in which the microparticle (A) is dispersed, and obtaining a resin particle (C) by removing the liquid or supercritical carbon dioxide (X) and the solvent (S).

(VI) A method for producing the resin particle of (I), including the steps of: forming a resin particle (C1) in which a microparticle (A) is fixed to a surface of a resin particle (B1) containing a resin (b) and a solvent (S) by dispersing a solution (L0) dissolving a precursor (b0) of the resin (b) in the solvent (S), in liquid or supercritical carbon dioxide (X) in which the microparticle (A) is dispersed, and allowing the precursor (b0) to react, and obtaining a resin particle (C) by removing the liquid or supercritical carbon dioxide (X) and the solvent (S).

Advantages of the Invention

The resin particles of the present invention, and resin particles obtained by the production method of the present invention have a sufficiently narrow particle size distribution, and realize a good humidity and heat resistant keeping property of the resin particles.

BRIEF DESCRIPTION OF THE DRAWINGS

FIG. 1 An experiment device used for production of resin particles.

DESCRIPTION OF REFERENCE SIGNS

T1: Resin solution tank
T2: Microparticle dispersion liquid tank
T3: Dispersion vessel (maximum use pressure 20 MPa, maximum use temperature 100° C., equipped with a stirrer)

T4: Particle collecting vessel (maximum use pressure 20 MPa, maximum use temperature 100° C.)
F1: Ceramic filter (mesh: 0.5 μm)
T5: Solvent trap
B1, B2: Carbon dioxide cylinder
P1, P2: Solution pump
P3, P4: Carbon dioxide pump
V1: Valve
V2: Pressure adjustment valve

BEST MODE FOR CARRYING OUT THE INVENTION

In the following, the present invention will be specifically described. The microparticle (A) is a microparticle having a degree of swelling by liquid or supercritical carbon dioxide (X) [hereinafter, sometimes referred to as carbon dioxide (X)] (hereinafter, referred to as a "degree of swelling") at a temperature lower than its glass transition temperature (hereinafter, sometimes referred to as a Tg) or its melting point of 16% or less, preferably 10% or less and more preferably 5% or less. When a microparticle having a degree of swelling greater than 16% is used, it is impossible to suppress aggregation of resin particles, so that the particle size distribution of resin particles is impaired.

As a method of measuring the degree of swelling, measurement using a magnetic floating balance is recited. Details of a measurement method of the degree of swelling can be found in J. Supercritical Fluids. 19, 187-198 (2001).

As the microparticle (A), at least one kind selected from a crystalline resin (a1), a noncrystalline resin (a2), and an inorganic compound (a3) is used. As the noncrystalline resin (a2), a crosslinked noncrystalline resin is more preferred. Among these, the crystalline resin (a1) and the noncrystalline resin (a2) are preferred, and the crystalline resin (a1) is more preferred.

The melting point of the crystalline resin (a1) is preferably 50 to 110° C., more preferably 55 to 100° C., and particularly preferably 60 to 90° C. When the melting point of the crystalline resin (a1) is 50° C. or higher, the resin particle (C) of the present invention is less likely to block after long-term storage. When the melting point is 110° C. or lower, the resin particle (C) realizes a good low temperature fixing property when used as a toner for electrophotography. The melting point can be determined from an endothermic peak in differential scanning calorimetry (hereinafter, abbreviated as "DSC").

The crystallinity of the crystalline resin (a1) is preferably 20 to 95%, and more preferably 30 to 80%, from the viewpoint of suppression of swelling by carbon dioxide (X) and adsorptivity to the resin particle (B). As to the crystallinity, a melting heat quantity [ΔHm (J/g)] is determined from an area of an endothermic peak using DSC, and the crystallinity (%) is calculated from the measured ΔHm according to the following formula.

$$\text{Crystallinity} = (\Delta Hm/a) \times 100$$

In the above formula, the symbol "a" represents a melting heat quantity obtainable as a result of extrapolation to make the crystallinity 100%.

The number average molecular weight of the crystalline resin (a1) is preferably 1000 or more, more preferably 1500 or more, and particularly preferably 2000 or more, from the viewpoint of a carrier staining property. From the viewpoint of the melt viscosity, it is preferably 1000000 or less, more preferably 500000 or less, and particularly preferably 300000 or less.

The composition of the crystalline resin (a1) is not particularly limited, however, preferred concrete examples thereof include an aliphatic or aromatic polyester, an aliphatic polyurethane and/or polyurea, a crystalline vinyl resin containing an alkyl(meth)acrylate as an essential constitutional unit, a crystalline vinyl resin (a14) containing (meth)acrylonitrile and a crystalline vinyl monomer as essential constitutional units, and a crystalline polyolefin (a15).

As the aliphatic or aromatic polyester, a diol (11) or a dicarboxylic acid (13) as will be described later may be used, and particularly preferred is a crystalline polyester (a11) containing a straight-chain aliphatic diol having an alkylene chain with 2 to 50 carbon atoms and a straight-chain aliphatic dicarboxylic acid having an alkylene chain with 2 to 50 carbon atoms as essential constitutional units, wherein the total number of the number of carbon atoms in the alkylene chain of the diol and the number of carbon atoms in the alkylene chain of the dicarboxylic acid is 10 to 52, and further containing an aromatic dicarboxylic acid with 6 to 30 carbon atoms as a constitutional unit as necessary.

From the viewpoint of storage stability, the total number of the number of carbon atoms in the alkylene chain of the diol and the number of carbon atoms in the alkylene chain of the dicarboxylic acid is preferably 10 or more, more preferably 12 or more, and particularly preferably 14 or more. Further, from the viewpoint of a fixing property, it is preferably 52 or less, more preferably 45 or less, particularly preferably 40 or less, and most preferably 30 or less.

The number of carbon atoms in the alkylene chain of the straight-chain aliphatic diol having an alkylene chain with 2 to 50 carbon atoms is preferably 2 or more, more preferably 3 or more, and particularly preferably 4 or more from the viewpoint of crystallinity. From the viewpoint of a fixing property, it is preferably 50 or less, more preferably 45 or less, particularly preferably 40 or less, and most preferably 30 or less. As the straight-chain aliphatic diol, 1,4-butanediol, 1,6-hexanediol, and 1,10-decanediol are preferred.

The number of carbon atoms in the alkylene chain of the straight-chain aliphatic dicarboxylic acid having an alkylene chain with 2 to 50 carbon atoms is preferably 2 or more, more preferably 3 or more, and particularly preferably 4 or more from the viewpoint of crystallinity. From the viewpoint of a fixing property, it is preferably 50 or less, more preferably 45 or less, particularly preferably 40 or less, and most preferably 30 or less. Preferred straight-chain aliphatic dicarboxylic acids include adipic acid, sebacic acid, dodecane dicarboxylic acid, and octadecane dicarboxylic acid.

Also from the viewpoint of storage stability of the aromatic polyester, the number of carbon atoms of the aromatic dicarboxylic acid is preferably 6 to 30, more preferably 8 to 24, and particularly preferably 8 to 20. Preferred aromatic dicarboxylic acids having 6 to 30 carbon atoms include phthalic acid, isophthalic acid, terephthalic acid, and naphthalene dicarboxylic acid.

In the case of the aromatic polyester, from the viewpoint of resin strength, it is preferred to use a combination of a straight-chain aliphatic dicarboxylic acid and an aromatic dicarboxylic acid as the dicarboxylic acid, and a percentage of the aromatic dicarboxylic acid relative to the total of the straight-chain aliphatic dicarboxylic acid and the aromatic dicarboxylic acid is preferably 90% by weight or less, more preferably 1 to 85% by weight, and particularly preferably 3 to 80% by weight.

As the aliphatic polyurethane and/or polyurea, a diol (11), a diamine [a bivalent one of the polyamines (16) described later], and a diisocyanate [a bivalent one of the polyisocyanates (15) described later] as will be described later may be used, and particularly preferred is a crystalline polyurethane and/or polyurea (a12) containing a straight-chain aliphatic diol having an alkylene chain with 2 to 50 carbon atoms and/or a straight-chain aliphatic diamine having an alkylene chain with 2 to 50 carbon atoms, and a straight-chain aliphatic diisocyanate having an alkylene chain with 2 to 50 carbon atoms as essential constitutional units, and has the total number of the average number of carbon atoms in the alkylene chain of the diol and/or the diamine, and the number of carbon atoms in the alkylene chain of the diisocyanate of 10 to 52.

Here, a polyurethane obtained from a polyester diol obtained by reacting a straight-chain aliphatic diol having an alkylene chain with 2 to 50 carbon atoms with a dicarboxylic acid (13) described later, and a straight-chain aliphatic diisocyanate having an alkylene chain with 2 to 50 carbon atoms is also included in (a12).

As to the aliphatic polyurethane and/or polyurea, the total number of the carbon atoms in the alkylene chain of the diol and/or the diamine (when a mixture of a diol and a diamine is used, the number of carbon atoms in the alkylene chain averaged by the weight ratio) and the number of carbon atoms in the alkylene chain of the diisocyanate is preferably 10 or more, more preferably 12 or more, and particularly preferably 14 or more from the viewpoint of storage stability. From the viewpoint of a fixing property, it is preferably 52 or less, more preferably 45 or less, particularly preferably 40 or less, and most preferably 30 or less.

A preferred number of carbon atoms in the alkylene chain and preferred concrete examples of the alkylene chain of the straight-chain aliphatic diol having an alkylene chain with 2 to 50 carbon atoms are same as those in the case of the crystalline polyester (a11).

The number of carbon atoms in the alkylene chain of the straight-chain aliphatic diamine having an alkylene chain with 2 to 50 carbon atoms is preferably 2 or more, more preferably 3 or more, and particularly preferably 4 or more from the viewpoint of crystallinity. From the viewpoint of a fixing property, it is preferably 50 or less, more preferably 45 or less, particularly preferably 40 or less, and most preferably 30 or less. Preferred straight-chain aliphatic diamines include tetramethylene diamine and hexamethylene diamine.

The number of carbon atoms in the alkylene chain of the straight-chain aliphatic diisocyanate having an alkylene chain with 2 to 50 carbon atoms is preferably 2 or more, more preferably 3 or more, and particularly preferably 4 or more from the viewpoint of crystallinity. From the viewpoint of a fixing property, it is preferably 50 or less, more preferably 45 or less, particularly preferably 40 or less, and most preferably 30 or less. Preferred straight-chain aliphatic diisocyanates include tetramethylene diisocyanate and hexamethylene diisocyanate.

As the crystalline vinyl resin containing an alkyl (meth)acrylate as an essential constitutional unit, a crystalline vinyl resin (a13) containing an alkyl (meth)acrylate having an alkyl group with 12 to 50 carbon atoms as an essential constitutional unit is preferred. From the viewpoint of storage stability, the number of carbon atoms in the alkyl group is preferably 12 or more, more preferably 14 or more, and particularly preferably 18 or more. From the viewpoint of a fixing property, it is preferably 50 or less, more preferably 40 or less, and particularly preferably 30 or less. From the viewpoint of storage stability, the alkyl group is of a straight chain. Preferred alkyl(meth)acrylates having an alkyl group with 12 to 50 carbon atoms include octadecyl(meth)acrylate, eicosyl (meth)acrylate, and behenyl acrylate.

The crystalline vinyl resin containing an alkyl(meth)acrylate as an essential constitutional unit may be a homopolymer of an alkyl(meth)acrylate or a copolymer with other monomers. As the other monomers, vinyl monomers as will be described later can be appropriately selected.

The content of the constitutional unit of the alkyl(meth) acrylate having an alkyl group with 12 to 50 carbon atoms in the crystalline vinyl resin (a13) is preferably 40% by weight or more, more preferably 45% by weight or more, and particularly preferably 60% by weight or more.

In the crystalline vinyl resin (a14) containing (meth)acrylonitrile and a crystalline vinyl monomer as essential constitutional units, the content of the constitutional unit of (meth) acrylonitrile is preferably 0.01 to 40% by weight, more preferably 0.05 to 35% by weight, and particularly preferably 0.1 to 30% by weight from the viewpoint of adhesiveness to a resin particle.

As a crystalline vinyl monomer used in combination, any monomer capable of forming a crystalline vinyl resin can be used without any particular limitation, and an alkyl(meth) acrylate, and ethylene having 12 to 50 carbon atoms in the alkyl group can be recited.

As the crystalline polyolefin (a15), polyethylene, polypropylene and the like are recited.

As a method for producing an aliphatic or aromatic polyester, publicly known production methods including a method of reacting a low molecular polyol and/or a polyalkylene ether diol having a number average molecular weight of 1000 or less, with a polycarboxylic acid, a method based on ring-opening polymerization of lactone, and a method of reacting a low molecular diol with carbonate diester of a lower alcohol (methanol or the like) can be recited.

As a method for producing the aliphatic polyurethane and/ or polyurea, publicly known production methods including a method of reacting a low molecular polyol (including polyester polyol obtained by the above method) and/or a low molecular weight diamine with a diisocyanate can be recited.

As a method for producing the crystalline vinyl resin containing an alkyl (meth)acrylate as an essential constitutional unit, and a method for producing the crystalline vinyl resin containing (meth)acrylonitrile and a crystalline vinyl monomer as essential constitutional units, publicly known polymerization methods for vinyl monomers such as solution polymerization, bulk polymerization, and suspension polymerization can be recited.

As a method for producing the polyolefin, publicly known polymerization methods including addition polymerization are recited.

Among the crystalline resins (a1), (a11), (a12), (a13), and (a14) are particularly preferred, and (a13) is most preferred.

As the noncrystalline resin (a2), for example, a vinyl resin, a polyurethane resin, an epoxy resin, a polyester resin, a polyamide, a polyimide, a silicone resin, a fluororesin, a phenol resin, a melamine resin, a polycarbonate, cellulose and mixtures thereof can be recited. As the noncrystalline resin (a2), a crosslinked noncrystalline resin is preferred.

The composition of (a2) is not particularly limited as far as the degree of swelling falls within the above range, and commonly used resins may be used.

For example, as the crosslinked vinyl resin, a copolymer of vinyl monomers including a vinyl monomer having two or more vinyl polymerizable functional groups (such as divinylbenzene), and the like are recited.

As the crosslinked polyester resin, a polyester resin which is a polycondensate of a polyol and a polycarboxylic acid, and is obtainable by using, as at least part of the polyol and/or the polycarboxylic acid, a tri- or more-valent polyol (12) and/or a tri- or more-valent polycarboxylic acid (14) described later, and the like are recited.

Similarly, also in the case of other resins, a resin obtainable by using a crosslinkable monomer at least partly is more preferred.

As the microparticle (A), a combination of the crystalline resin (a1) and the noncrystalline resin (a2) may be used. The melting point of a mixture of (a1) and (a2) is preferably 50 to 150° C. The content of (a2) is preferably 0 to 50% by weight relative to the total weight of (a1) and (a2). Also, the microparticle may be of the noncrystalline resin (a2) covered with the crystalline resin (a1).

The production method of the microparticle (A) containing the crystalline resin (a1) and/or the noncrystalline resin (a2) may be any method, and concrete examples thereof include: a dry production method [a method of dry-grinding a material (a) forming the microparticle (A) by means of a publicly known dry grinder such as a jet mill], and wet production methods [a method of dispersing a powder of (a) in an organic solvent, and wet-grinding it by means of a publicly known wet disperser such as a beads mill or a roll mill, a method of spray-drying a solution of (a) in a solvent by means of a spray drier or the like, a method of supersaturating a solution of (a) in a solvent to cause deposition by addition of a poor solvent or cooling, a method of dispersing a solution of (a) in a solvent, in water or an organic solvent, a method of polymerizing a precursor of (a) by emulsion polymerization, soap free emulsion polymerization, seed polymerization, suspension polymerization or the like in water, and a method of polymerizing a precursor of (a) by dispersion polymerization or the like in an organic solvent]. Further, after synthesizing a microparticle (A') of the noncrystalline resin (a2) by the above method, the crystalline resin (a1) may be formed on a surface of (A') by a publicly known coating method, seed polymerization method, or mechanochemical method, or the like. Among these, from the viewpoint of easiness of production of the microparticle (A), a wet production method is preferred, and the methods based on deposition, emulsion polymerization, and dispersion polymerization are more preferred.

The microparticle (A) may be used as it is, or may be surface-modified, for example, by a surface treatment with a silane-, titanate-, or aluminate-based coupling agent, by a surface treatment with various surfactants, or by a coating treatment with a polymer, for imparting adsorptivity to the resin particle (B) or for modifying powder characteristics and electric characteristics of the resin particle (C) of the present invention. It is preferred that either one of the microparticle (A) and the resin particle (B) has an acidic functional group in at least its surface, and the other one has a basic functional group in at least its surface.

The microparticle (A) and the resin particle (B) may internally have an acidic functional group or a basic functional group. As the acidic functional group, a carboxylic acid group, a sulfonic acid group and the like are recited. As the basic functional group, a primary amino group, a secondary amino group, a tertiary amino group and the like are recited.

As to the microparticle (A) and the resin particle (B), it is possible to use resins having an acidic functional group or a basic functional group as the crystalline resin (a1) and the resin (b) for giving an acidic functional group or a basic functional group to at least their surfaces, or to surface-treat the microparticle (A) and the resin particle (B) for giving these functional groups.

As the crystalline resin (a1) having an acidic functional group, an aliphatic polyester having an acid value, a vinyl resin obtained by copolymerization of monomers having an acidic functional group (for example, a carboxyl group-containing vinyl monomer, a sulfone group-containing vinyl monomer and the like described later), and the like are recited.

As the crystalline resin (a1) having a basic functional group, a vinyl resin obtained by copolymerization of monomers having a basic functional group (for example, an amino group-containing vinyl monomer and the like described later), and the like are recited.

As the inorganic compound (a3), for example, metal oxides such as diatom earth, alumina, zinc oxide, titania, zirconia, calcium oxide, magnesium oxide, iron oxide, copper oxide, tin oxide, chromium oxide, antimony oxide, yttrium oxide, cerium oxide, samarium oxide, lanthanum oxide, tantalum oxide, terbium oxide, europium oxide, neodymium oxide and ferrite, metal hydroxides such as calcium hydroxide, magnesium hydroxide, aluminum hydroxide and basic magnesium carbonate, metal carbonates such as heavy calcium carbonate, light calcium carbonate, zinc carbonate, barium carbonate, dawsonite and hydrotalcite, metal sulfates such as calcium sulfate, barium sulfate and gypsum fiber, metal silicates such as silica, calcium silicate (wollastonite, xonotlite), kaolin, clay, talc, mica, montmorillonite, bentonite, activated white earth, sepiolite, imogolite, sericite, glass fiber, glass beads and glass flake, metal nitrides such as aluminum nitride, boron nitride and silicon nitride, metal titanates such as potassium titanate, calcium titanate, magnesium titanate, barium titanate and lead zirconate titanate aluminum borate, metal borates such as zinc borate and aluminum borate, metal phosphates such as tricalcium phosphate, metal sulfides such as molybdenum sulfide, metal carbides such as silicon carbide, carbon substances such as carbon black, graphite and carbon fiber, and inorganic particles of gold, silver and other substances can be recited. Among these, silica and metal carbonates are preferred.

The resin particle (B) is formed of the resin (b). In the present invention, as the resin (b), a thermoplastic resin (b1) or a resin (b2) obtained by slightly crosslinking the thermoplastic resin, or a polymer blend (b3) including a thermoplastic resin as a sea component and a cured resin as an island component is recited, and two or more kinds may be used in combination. As the thermoplastic resin (b1), for example, a vinyl resin, a polyurethane resin, an epoxy resin, a polyester resin and the like are recited. Among these, a vinyl resin, a polyurethane resin, a polyester resin and combined use of these are preferred from the viewpoint that a dispersion of microspherical resin particles can be easily obtained.

The vinyl resin is a polymer obtained by homopolymerizing or copolymerizing vinyl monomers. As the vinyl monomer, the following (1) to (10) can be recited.

(1) Vinyl hydrocarbons:

(1-1) Aliphatic vinyl hydrocarbons: alkenes such as ethylene, propylene, and α-olefins other than the above; alkadienes such as butadiene, isoprene, 1,4-pentadiene, 1,6-hexadiene and 1,7-octadiene.

(1-2) Alicyclic vinyl hydrocarbons: mono- or di-cycloalkenes and alkadienes such as (di)cyclopentadiene; and terpenes such as pinene.

(1-3) Aromatic vinyl hydrocarbons: styrene and its hydrocarbyl (alkyl, cycloalkyl, aralkyl and/or alkenyl) substitutes such as α-methylstyrene and 2,4-dimethylstyrene; and vinylnaphthalene.

(2) Carboxyl group-containing vinyl monomers and salts thereof: carboxyl group-containing vinyl monomers such as unsaturated monocarboxylic acids and unsaturated dicarboxylic acids each having 3 to 30 carbon atoms, anhydrides thereof, and monoalkyl (having 1 to 24 carbon atoms) esters thereof, such as (meth)acrylic acid, (anhydrous) maleic acid, maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, and cinnamic acid.

(3) Sulfone group-containing vinyl monomers, vinyl sulfuric acid monoesterified compounds and salts thereof: alkene sulfonic acids having 2 to 14 carbon atoms such as vinyl sulfonic acid; and alkyl derivatives thereof having 2 to 24 carbon atoms such as α-methylstyrene sulfonic acid; sulfo (hydroxy)alkyl-(meth)acrylate or (meth)acrylamide such as sulfopropyl(meth)acrylate, and sulfuric acid ester or sulfonic acid group-containing vinyl monomers; salts thereof, and the like.

(4) Phosphoric acid group-containing vinyl monomers and salts thereof: (meth)acryloyloxyalkyl (C1 to C24) phosphoric acid monoesters, such as 2-hydroxyethyl (meth)acryloyl phosphate, phenyl-2-acryloyloxy ethylphosphate, (meth) acryloyloxy alkyl (having 1 to 24 carbon atoms) phosphonic acids such as 2-acryloyloxy ethylphosphonic acid. As salts of the above (2) to (4), for example, alkali metal salts (sodium salt, potassium salt and the like), alkaline earth metal salts (calcium salt, magnesium salt and the like), ammonium salt, amine salt or quaternary ammonium salt are recited.

(5) Hydroxyl group-containing vinyl monomers: hydroxystyrene, N-methylol(meth)acrylamide, hydroxyethyl(meth) acrylate, hydroxypropyl (meth)acrylate, polyethylene glycolmono(meth)acrylate, (meth)allyl alcohol, crotyl alcohol, isocrotyl alcohol, 1-butene-3-ol, 2-butene-1-ol, 2-butene-1, 4-diol, propargyl alcohol, 2-hydroxyethyl propenyl ether, sucrose allyl ether and the like.

(6) Nitrogen-containing vinyl monomers:
(6-1) Amino group-containing vinyl monomers: aminoethyl (meth)acrylate and the like,
(6-2) Amide group-containing vinyl monomers: (meth) acrylamide, N-methyl(meth)acrylamide and the like,
(6-3) Nitrile group-containing vinyl monomers: (meth) acrylonitrile, cyanostyrene, cyanoacrylate and the like,
(6-4) Quaternary ammonium cation group-containing vinyl monomers: quaternized compounds of tertiary amine group-containing vinyl monomers such as dimethylaminoethyl(meth)acrylate, diethylaminoethyl(meth)acrylate, dimethylaminoethyl(meth)acrylamide, diethylaminoethyl(meth) acrylamide, and diallylamine (quaternized by using a quaternizing agent such as methyl chloride, dimethylsulfuric acid, benzyl chloride or dimethyl carbonate) and the like, and
(6-5) Nitro group-containing vinyl monomers: nitro styrene and the like.

(7) Epoxy group-containing vinyl monomers: glycidyl (meth)acrylate, tetrahydrofurfuryl(meth)acrylate, p-vinyl phenylphenyl oxide and the like.

(8) Halogen element-containing vinyl monomers: vinyl chloride, vinyl bromide, vinylidene chloride, allyl chloride, chlorostyrene, bromostyrene, dichlorostyrene, chloromethyl styrene, tetrafluoro styrene, chloroprene and the like.

(9) Vinyl esters, vinyl(thio)ethers, vinyl ketones, and vinyl sulfones:
(9-1) Vinyl esters such as vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl(meth)acrylate, vinyl methoxy acetate, vinylbenzoate, ethyl α-ethoxyacrylate, alkyl(meth)acrylates having an alkyl group with 1 to 50 carbon atoms [methyl(meth)acrylate, ethyl (meth)acrylate, propyl(meth)acrylate, butyl(meth)acrylate, 2-ethylhexyl(meth)acrylate, dodecyl(meth)acrylate, hexadecyl(meth)acrylate, heptadecyl(meth)acrylate, octadecyl (meth)acrylate, eicosyl(meth)acrylate, behenyl(meth)acrylate and the like], dialkyl fumarate (two alkyl groups are straight-chain, branched-chain, or alicyclic groups having 2 to 8 carbon atoms), dialkyl maleate (two alkyl groups are straight-chain, branched-chain, or alicyclic groups having 2 to 8 carbon atoms), poly(meth)allyloxy alkanes [diallyloxy ethane, triallyloxy ethane, tetraallyloxy ethane, tetraallyloxy propane, tetraallyloxy butane, tetramethallyloxy ethane and the like] and the like, vinyl monomers having a polyalkylene glycol chain [polyethylene glycol (molecular weight: 300) mono(meth)acrylate, polypropylene glycol (molecular weight: 500) monoacrylate, methylalcohol ethylene oxide 10-mol adduct (meth)acrylate, lauryl alcohol ethylene oxide 30-mol adduct (meth)acrylate and the like], poly(meth)acrylates [poly(meth)acrylates of polyhydric alcohols: ethylene glycol di(meth)acrylate, propylene glycol di(meth)acrylate, neopentyl glycol di(meth)acrylate, trimethylol propane tri (meth)acrylate, polyethylene glycol di(meth)acrylate and the like] and the like,
(9-2) Vinyl(thio)ethers such as vinylmethyl ether, and
(9-3) Vinyl ketones such as vinylmethyl ketone.

(10) Other vinyl monomers: isocyanatoethyl (meth)acrylate, m-isopropenyl-α,α-dimethylbenzyl isocyanate and the like.

As the copolymer of vinyl monomers, polymers obtained by copolymerization of arbitrary monomers of the above (1) to (10) at arbitrary ratios are recited, and for example, a styrene-(meth)acrylic acid ester copolymer, a styrene-butadiene copolymer, a (meth)acrylic acid-acrylic acid ester copolymer, a styrene-acrylonitrile copolymer, a styrene-maleic anhydride copolymer, a styrene-(meth)acrylic acid copolymer, a styrene-(meth)acrylic acid, divinylbenzene copolymer, a styrene-styrene sulfonic acid-(meth)acrylic acid ester copolymer and the like are recited.

As the polyester resin, polycondensates of polyols and polycarboxylic acids (including anhydrides and lower alkylesters thereof) and the like are recited. As the polyol, the diol (11) and the tri- or more-valent polyol (12) are recited, and as the polycarboxylic acid, the dicarboxlyic acid (13) and the tri- or more-valent polycarboxylic acid (14) are recited.

The reaction ratio between the polyol and the polycarboxylic acid is preferably 2/1 to 1/1, more preferably 1.5/1 to 1/1, and particularly preferably 1.3/1 to 1.02/1 by the equivalent ratio [OH]/[COOH] between the hydroxyl group [OH] and the carboxyl group [COOH].

As the diol (11), alkylene glycols (ethylene glycol, 1,2-propylene glycol, 1,3-propylene glycol, 1,4-butanediol, 1,6-hexanediol, octanediol, decanediol, dodecanediol, tetradecanediol, neopentyl glycol, 2,2-diethyl-1,3-propanediol, and the like); alkyleneether glycols (diethylene glycol, triethylene glycol, dipropylene glycol, polyethylene glycol, polypropylene glycol, polytetramethylene ether glycol, and the like); alicyclic diols (1,4-cyclohexanedimethanol, hydrogenated bisphenol A, and the like); bisphenols (bisphenol A, bisphenol F, bisphenol S, and the like); alkylene oxide (ethylene oxide, propylene oxide, butylene oxide, or the like) adducts of the above alicyclic diols; alkylene oxide (ethylene oxide, propylene oxide, butylene oxide, and the like) adducts of the above bisphenols; and polylactone diols (poly ε-caprolactonediol, and the like), polybutadiene diols and the like are recited. Among these, alkylene glycols having 2 to 12 carbon atoms, and alkylene oxide adducts of bisphenols are preferred, and combinational use of an alkylene oxide adduct of bisphenols, and an alkylene glycol having 2 to 12 carbon atoms is particularly preferred.

As the tri- or more-valent polyol (12), 3 to 8- or more-valent polyvalent aliphatic alcohols (glycerin, trimethylol ethane, trimethylol propane, pentaerythritol, sorbitol, and the like); tris-phenols (tris-phenol PA, and the like); novolac resins (phenol novolac, cresol novolac, and the like); alkylene oxide adducts of the above tris-phenols; alkylene oxide adducts of the above novolac resins, acrylpolyols [copolymers of hydroxyethyl(meth)acrylate and other vinyl monomers] and the like are recited.

As the dicarboxylic acid (13), alkylene dicarboxylic acids (succinic acid, adipic acid, sebacic acid, dodecenylsuccinic acid, azelaic acid, sebacic acid, dodecanedicarboxylic acid, octadecanedicarboxylic acid, and the like); alkenylene dicarboxylic acids (maleic acid, fumaric acid, and the like); branched alkylenedicarboxylic acids having 8 or more carbon atoms [dimer acid, alkenylsuccinic acids (dodecenyl succinic acid, pentadecenylsuccinic acid, octadecenylsuccinic acid, and the like), alkylsuccinic acids (decylsuccinic acid, dodecylsuccinic acid, octadecylsuccinic acid, and the like)]; aromatic dicarboxylic acids (phthalic acid, isophthalic acid, terephthalic acid, naphthalene dicarboxylic acid, and the like) and the like are recited. Among these, alkenylene dicarboxylic acids having 4 to 20 carbon atoms and aromatic dicarboxylic acids having 8 to 20 carbon atoms are preferred.

As the tri- or more-valent (3 to 6- or more-valent) polycarboxylic acid (14), aromatic polycarboxylic acids having 9 to 20 carbon atoms (trimellitic acid, pyromellitic acid, and the like) and the like are recited.

As the dicarboxylic acid (13) or the tri- or more-valent polycarboxylic acid (14), acid anhydrides or lower alkyl esters (methyl esters, ethyl esters, isopropyl esters, and the like) of the above compounds may be used.

As the polyurethane resin, polyadducts of the polyisocyanate (15) and an active hydrogen group-containing compound (D) {water, polyols [the diol (11) and the tri- or more-valent polyol (12)], the dicarboxylic acid (13), the tri- or more-valent polycarboxylic acid (14), the polyamine (16), the polythiol (17), and the like} and the like are recited.

As the polyisocyanate (15), aromatic polyisocyanates having 6 to 20 carbon atoms (excluding carbon atoms in the NCO group, the same shall apply hereinafter), aliphatic polyisocyanates having 2 to 18 carbon atoms, alicyclic polyisocyanates having 4 to 15 carbon atoms, araliphatic polyisocyanates having 8 to 15 carbon atoms and modified compounds of these polyisocyanates (urethane group-, carbodiimide group-, allophanate group-, urea group-, biuret group-, urethodione group-, urethoimine group-, isocyanurate group-, and oxazolidone group-containing modified compounds, and the like) and mixtures of two or more kinds of these are recited.

Concrete examples of the above aromatic polyisocyanate include 1,3- and/or 1,4-phenylene diisocyanate, 2,4- and/or 2,6-tolylene diisocyanate (TDI), and 2,4'- and/or 4,4'-diphenyl methanediisocyanate (MDI).

Concrete examples of the above aliphatic polyisocyanate include ethylene diisocyanate, tetramethylene diisocyanate, and hexamethylene diisocyanate (HDI).

Concrete examples of the above alicyclic polyisocyanate include isophorone diisocyanate (IPDI), dicyclohexyl methane-4,4'-diisocyanate (hydrogenated MDI), cyclohexylene diisocyanate, and methylcyclohexylene diisocyanate (hydrogenated TDI).

Concrete examples of the above araliphatic polyisocyanate include m- and/or p-xylylene diisocyanate (XDI), and α,α,α',α'-tetramethylxylylene diisocyanate (TMXDI).

As the above modified compounds of polyisocyanates, urethane group-, carbodiimide group-, allophanate group-, urea group-, biuret group-, urethdione group-, urethimine group-, isocyanurate group-, and oxazolidone group-containing modified compounds and the like are recited. Concrete examples thereof include modified compounds of polyisocyanates such as modified MDI (urethane-modified MDI, carbodiimide-modified MDI, trihydrocarbyl phosphate-modified MDI, and the like) and urethane-modified TDI and mixtures of two or more kinds of these [for example, combinational use of modified MDI and urethane-modified TDI (an isocyanate-containing prepolymer)].

Among these, aromatic polyisocyanates having 6 to 15 carbon atoms, aliphatic polyisocyanates having 4 to 12 carbon atoms, and alicyclic polyisocyanates having 4 to 15 carbon atoms are preferred, and TDI, MDI, HDI, hydrogenated MDI, and IPDI are particularly preferred.

Examples of the polyamine (16) include the following substances.

Aliphatic polyamines (C2 to C18):
[1] Aliphatic polyamines {C2 to C6 alkylenediamines (ethylenediamine, tetramethylenediamine, hexamethylenediamine, and the like), polyalkylene (C2 to C6) polyamines [diethylenetriamine, and the like]}
[2] Alkyl (C1 to C4) or hydroxyalkyl (C2 to C4) substitutes [dialkyl (C1 to C3) aminopropylamine, and the like] of these
[3] Alicyclic ring or heterocyclic ring-containing aliphatic polyamines [3,9-bis(3-aminopropyl)-2,4,8,10-tetraoxaspiro[5,5]undecane, and the like]
[4] Aromatic ring-containing aliphatic amines (C8 to C15) (xylylene diamine, tetrachloro-p-xylylene diamine, and the like), Alicyclic polyamines (C4 to C15): 1,3-diaminocyclohexane, isophorone diamine, menthene diamine, 4,4'-methylenedicyclohexane diamine (hydrogenated methylene dianiline), and the like, Aromatic polyamines (C6 to C20):
[1] Unsubstituted aromatic polyamines [1,2-, 1,3- and 1,4-phenylene diamines, and the like]; aromatic polyamines having nuclear-substituted alkyl groups [C1 to C4 alkyl groups such as methyl, ethyl, n- and i-propyl, and butyl), for example, 2,4- and 2,6-tolylene diamine, and the like], and mixtures of these isomers in various ratios
[2] Aromatic polyamines having nuclear-substituted electron-withdrawing groups (halogens such as Cl, Br, I and F; alkoxy groups such as methoxy and ethoxy; a nitro group, and the like) [methylenebis-o-chloroaniline, and the like]
[3] Aromatic polyamines having a secondary amino group [—NH$_2$ of the aromatic polyamine of the above (4) to (6) is partly or entirely substituted by —NH—R' (R' is substituted by a lower alkyl group such as methyl or ethyl][4,4'-di(methylamino)diphenylmethane, 1-methyl-2-methylamino-4-aminobenzene, and the like], Heterocyclic polyamines (C4 to C15): piperazine, N-aminoethyl piperazine, 1,4-diaminoethyl piperazine, 1,4-bis(2-amino-2-methylpropyl)piperazine, and the like, Polyamide polyamines: low molecular weight polyamide polyamines obtainable by condensation of dicarboxylic acids (dimer acid, and the like) and excess (2 mol or more per 1 mol of the acid) polyamines (the above alkylenediamine, polyalkylene polyamine, and the like) and the like, Polyether polyamines: hydrogenated products of cyanoethylated compounds of polyether polyols (polyalkylene glycol, and the like) and the like.

As the polythiol (17), ethylene dithiol, 1,4-butane dithiol, 1,6-hexanedithiol and the like are recited.

As the epoxy resin, a ring-opening polymer of the polyepoxide (18), a polyadduct of the polyepoxide (18) and the active hydrogen group-containing compound (D) {water, polyols [the diol (11) and the tri- or more-valent polyol (12)], the dicarboxylic acid (13), the tri- or more-valent polycarboxylic acid (14), the polyamine (16), the polythiol (17), and the like}, or a cured product of the polyepoxide (18) and the dicarboxylic acid (13) or an acid anhydride of the tri- or more-valent polycarboxylic acid (14) are recited.

As the polyepoxide (18), there is no limitation as far as two or more epoxy groups are contained in the molecule. A preferred polyepoxide (18) has 2 to 6 epoxy groups in the molecule from the viewpoint of mechanical properties of the cured product. The epoxy equivalent (molecular weight per one epoxy group) of the polyepoxide (18) is preferably 65 to 1000, and more preferably 90 to 500. When the epoxy equivalent is 1000 or less, the crosslinked structure is dense, and physical properties such as water resistance, chemical resistance, and mechanical strength of the cured product are improved, while the one having an epoxy equivalent of 65 or more is easy to synthesize.

As an example of the polyepoxide (18), an aromatic polyepoxy compound, a heterocyclic polyepoxy compound, an alicyclic polyepoxy compound or an aliphatic polyepoxy compound can be recited. As the aromatic polyepoxy compound, a glycidyl ether and a glycidyl ester of polyphenols, a glycidyl aromatic polyamine, and a glycidyl compound of an aminophenol are recited. As the glycidyl ether of a polyphenol, bisphenol F diglycidyl ether, bisphenol A diglycidyl ether and the like are recited. As the glycidyl ester of a polyphenol, phthalic acid diglycidyl ester, isophthalic acid diglycidyl ester, terephthalic acid diglycidyl ester and the like are recited. As the glycidyl aromatic polyamine, N,N-diglycidyl aniline, N,N,N',N'-tetraglycidylxylylene diamine, N,N,N',N'-tetraglycidyl diphenylmethane diamine and the like are recited. Further, in the present invention, as the aromatic polyepoxy compound, triglycidyl ether of p-aminophenol, a diglycidylurethane compound obtained by addition reaction between tolylene diisocyanate or diphenylmethane diisocyanate and glycidol, a glycidyl group-containing polyurethane (pre)polymer obtained by letting also a polyol react on the above two reactants, and a diglycidyl ether of an alkylene oxide (ethylene oxide or propylene oxide) adduct of bisphenol A are included. As the heterocyclic polyepoxy compound, tris-glycidyl melamine is recited. As the alicyclic polyepoxy compound, vinyl cyclohexene dioxide and the like are recited. As the alicyclic polyepoxy compound, a nuclear hydrogenated product of the aromatic polyepoxide compound is also included. As the aliphatic polyepoxy compound, a polyglycidyl ether of a polyvalent aliphatic alcohol, a polyglycidyl ester of a polyvalent fatty acid, and a glycidyl aliphatic amine are recited. As the polyglycidyl ether of a polyvalent aliphatic alcohol, ethylene glycol diglycidyl ether, propylene glycol diglycidyl ether and the like are recited. As the polyglycidyl ester of a polyvalent fatty acid, diglycidyl oxalate, diglycidyl maleate, diglycidyl succinate, diglycidyl glutarate, diglycidyl adipate, diglycidyl pimelate and the like are recited. As the glycidyl aliphatic amine, N,N,N',N'-tetraglycidyl hexamethylenediamine is recited. In the present invention, as the aliphatic polyepoxy compound, a diglycidyl ether and (co)polymer of glycidyl(meth)acrylate are also included. Among these, an aliphatic polyepoxy compound and an aromatic polyepoxy compound are preferred. Two or more kinds of polyepoxides may be used in combination.

By the term resin (b2) obtained by slightly crosslinking a thermoplastic resin, a resin having a Tg of the resin (b) of 20 to 200° C. as a result of introduction of a crosslinked structure is meant. Such a crosslinked structure may be of any crosslinked forms including a covalent bond, a coordinate linkage, an ionic bond, a hydrogen bond and the like. As a concrete example, for example, when a polyester is selected as the resin (b2), a crosslinked structure can be introduced by using the one having a number of functional groups of 3 or more as either one or both of the polyol and the polycarboxylic acid at the time of polymerization. Also when a vinyl resin is selected as the resin (b2), a crosslinked structure can be introduced by adding a monomer having two or more double bonds at the time of polymerization.

As the polymer blend (b3) including a thermoplastic resin as a sea component and a cured resin as an island component, the one having a Tg of 20 to 200° C. and a softening starting temperature of 40 to 220° C., concretely, a vinyl resin, a polyester resin, a polyurethane resin, an epoxy resin and a mixture thereof are recited.

The number average molecular weight (measured by GPC, hereinafter, sometimes abbreviated as an Mn) of the resin (b) is preferably 1000 to 5,000,000, and more preferably 2,000 to 500,000, and the solubility parameter (an SP value, the details will be described later) is preferably 7 to 18, and more preferably 8 to 14. For modification of heat characteristics of the resin particle (C) of the present invention, the resin (b2) or the resin (b3) may be used.

The glass transition temperature (Tg) of the resin (b) is preferably 20° C. to 200° C., and more preferably 40° C. to 150° C. When it is 20° C. or higher, storage stability of particles is good. The Tg in the present invention is a value determined by DSC measurement.

The softening starting temperature of the resin (b) is preferably 40° C. to 220° C., and more preferably 50° C. to 200° C. When it is 40° C. or higher, good long-term storage stability is realized. When it is 220° C. or lower, no problem arises because the fixing temperature does not increase. The softening starting temperature in the present invention is a value determined by flow tester measurement.

The volume average particle size of the resin particle (B) is preferably 1 to 10 µm, and more preferably 2 to 8 µm.

The resin particle (C) of the present invention is a particle in which the microparticle (A) is fixed to a surface of the resin particle (B), or a particle in which a film of the microparticle (A) is formed on a surface of the resin particle (B). The expression that the microparticle (A) is fixed to a surface of the resin particle (B) excludes the case where (A) is simply attached to a surface of (B) and thus is easily detached therefrom.

The particle size of the microparticle (A) is smaller than that of the resin particle (B). The value of the particle size ratio [the volume average particle size of the microparticle (A)/the volume average particle size of the resin particle (C) of the present invention] is preferably 0.001 to 0.3, more preferably 0.002 to 0.2, further preferably 0.003 to 0.1, and particularly preferably 0.01 to 0.08. Within the above ranges, (A) is adsorbed to a surface of (B) efficiently, so that the particle size distribution of the obtainable resin particle (C) of the present invention is narrower.

The volume average particle size of the microparticle (A) is preferably 0.01 to 0.5 µm, and particularly preferably 0.015 to 0.4 µm. The volume average particle size can be measured by a dynamic light scattering particle size distribution measuring device (for example, LB-550: manufactured by HORIBA, Ltd.), a laser particle size distribution measuring device (for example, LA-920: manufactured by HORIBA, Ltd.), Multisizer III (manufactured by Beckman Coulter, Inc.) and the like.

The volume average particle size of the resin particle (C) of the present invention is preferably 1 to 10 µm, more preferably 2 to 8 µm, and further preferably 3 to 6 µm. When it is 1 µm or more, a handling property as a powder is improved. When it is 10 µm or less, the resolution of an image is improved when it is used for electrophotographic toner.

A ratio DV/DN between a volume average particle size DV of the resin particle (C) of the present invention, and a number average particle size DN of the resin particle (C) of the present invention is preferably 1.0 to 1.5, more preferably 1.0 to 1.4, and particularly preferably 1.0 to 1.3. When it is 1.5 or less, powder characteristics (fluidity, charging uniformity and the like), and the resolution of an image are significantly improved.

From the viewpoints of particle size uniformity, powder fluidity, storage stability and the like, in the resin particle (C) of the present invention, preferably 5% or more, and more preferably 30% or more of a surface of the resin particle (B) is covered with the microparticle (A) or with a film derived from (A). The surface coverage percentage can be determined based on the following formula from image analysis of an image obtained by a scanning electron microscope (SEM):

Surface coverage percentage (%)=[surface area of (B) of the part covered with (A) or film derived from (A)/{surface area of (B) of the part covered with (A) or with film derived from (A)+area of the part where surface of (B) is exposed}]×100

In the resin particle (C) of the present invention, a weight ratio between the material (a) forming the microparticle (A) and the resin (b) forming the resin particle (B) is preferably (0.1:99.9) to (30:70), and more preferably (0.2:99.8) to (20:80). A weight ratio between the material (a) and the resin (b) falling within these ranges is preferred because both the low temperature fixing property and long-term storage stability are realized.

When (a) in the resin particle (C) of the present invention is the crystalline resin (a1), the weight ratio may be measured by a method of calculating the weight percentage of the crystalline resin (a1) from an endothermic amount of an endothermic peak inherent to (a1) by a publicly known method, for example, by DSC.

The resin particle (C) of the present invention is preferably obtained by the following production methods in which production is conducted in liquid or supercritical carbon dioxide (X).

Production Method (1)

A production method of obtaining a resin particle by dispersing a precursor (b0) of a resin (b) in carbon dioxide (x) in which a microparticle (A) is dispersed, and allowing the precursor (b0) to react, thereby forming a resin particle (C) in which the microparticle (A) is fixed to a surface of a resin particle (B) containing the resin (b), and removing carbon dioxide (X).

Production Method (2)

A production method of obtaining a resin particle by dispersing a solution (L) dissolving a resin (b) in a solvent (s), in carbon dioxide (X) in which a microparticle (A) is dispersed, thereby forming a resin particle (C1) in which the microparticle (A) is fixed to a surface of a resin particle (B1) containing the resin (b) and the solvent (S), and removing carbon dioxide (X) and the solvent (S).

Production Method (3)

A production method of obtaining a resin particle by dispersing a solution (L0) dissolving a precursor (b0) of a resin (b) in a solvent (S), in carbon dioxide (X) in which a microparticle (A) is dispersed, and further allowing the precursor (b0) to react, thereby forming a resin particle (C1) in which the microparticle (A) is fixed to a surface of a resin particle (B1) containing the resin (b) and the solvent (S), and removing carbon dioxide (X) and the solvent (S).

Production Method (2) will be specifically described.

An insoluble content of the resin (b) relative to the solvent (S) in an equivalent weight mixture of the solvent (S) and the resin (b) in a standard condition of 23° C. and 0.1 MPa is preferably 20% by weight or less, and more preferably 15% by weight or less, relative to the weight of the resin (b). When the weight of the insoluble content (% by weight) is 20% by weight or less, the particle size distribution of the resin particle to be obtained is narrower.

In Production Method (3), the same applies also when the precursor (b0) is used in place of the resin (b), and when a mixture of the resin (b) and the precursor (b0) is used.

The solubility parameter (an SP value) of the solvent (S) is preferably 9 to 16, and more preferably 10 to 15. The SP value is represented by square root of a ratio of a cohesion energy density and a molecular volume as shown below.

$$SP=(\Delta E/V)^{1/2}$$

Here, $\Delta E$ represents a cohesion energy density. V represents a molecular volume, and the value is based on the calculation by Robert F. Fedors et al., and described, for example, in Polymer engineering and science, vol. 14, pp. 147 to 154.

Concrete examples of the solvent (S) include ketone solvents (acetone, methyl ethyl ketone, and the like), ether solvents (tetrahydrofuran, diethylether, ethylene glycol monoalkyl ether, propylene glycol monoalkyl ether, cyclic ethers, and the like), ester solvents (acetic acid esters, pyruvic acid esters, 2-hydroxyisobutyric acid esters, lactic acid esters, and the like), amide solvents (dimethylformamide, and the like), alcohols (methanol, ethanol, fluorine-containing alcohols, and the like), aromatic hydrocarbon solvents (toluene, xylene, and the like), and aliphatic hydrocarbon solvents (octane, decane, and the like) and the like. A mixed solvent of two or more kinds of these solvents, or a mixed solvent of such organic solvents and water may also be used.

From the viewpoint of ease of particle formation, as a single solvent, a cyclic ether, a pyruvic acid ester, an ethylene glycol monoalkyl ether, a propylene glycol monoalkyl ether, a 2-hydroxyisobutyric acid ester, a lactic acid ester, or a fluorine-containing alcohol is preferred.

As the cyclic ether, 1,4-dioxane, 1,3-dioxolane and the like are recited.

As the pyruvic acid ester, methyl pyruvate, ethyl pyruvate and the like are recited.

As the ethylene glycol monoalkyl ether, ethylene glycol monomethyl ether, ethylene glycol monoethyl ether and the like are recited.

As the propylene glycol monoalkyl ether, propylene glycol monomethyl ether, propylene glycol monoethyl ether and the like are recited.

As the 2-hydroxyisobutyric acid ester, methyl 2-hydroxyisobutyrate and the like are recited.

As the lactic acid ester, methyl lactate, ethyl acetate and the like are recited.

As the fluorine-containing alcohol, 2,2,3,3-tetrafluoropropanol, trifluoroethanol and the like are recited.

As the mixed solvent, a mixed solvent of acetone, methanol and water, a mixed solvent of acetone and methanol, a mixed solvent of acetone and ethanol, a mixed solvent of acetone and water, and a mixed solvent of methyl ethyl ketone and water are preferred.

The same applies to the solvent (S) in Production Method (3).

The solution (L) of the resin (b) is produced by dissolving the resin (b) in the solvent (S). The concentration of the resin (b) relative to the weight of the solution (L) is preferably 10 to 90% by weight, and more preferably 20 to 80% by weight.

The same applies to the concentration of the precursor (b0) in the solution (L0) in Production Method (3).

In the dispersing step of Production Method (2) of dispersing the solution (L) of the resin (b) in carbon dioxide (X), a dispersion stabilizer (E) as will be described below may be used. The dispersion stabilizer (E) is a compound having at least one group of a dimethylsiloxane group and a fluorine-containing functional group. Further, it is preferred to have a chemical structure having affinity with the resin (b) together with a dimethylsiloxane group having affinity with carbon dioxide, and a fluorine-containing group.

For example, when the resin (b) is a vinyl resin, the dispersion stabilizer (E) is preferably a vinyl resin that contains a monomer having at least one group of a dimethylsiloxane group and a fluorine-containing functional group as a constitutional unit.

As a monomer having a dimethylsiloxane group (or a reactive oligomer) (M1-1), methacryl-modified silicone is preferred, and it has a structure shown by the following formula.

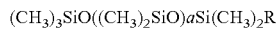

$(CH_3)_3SiO((CH_3)_2SiO)aSi(CH_3)_2R$

In the formula, "a" is 15 to 45 in an average, and R is an organic modified group including a methacryl group. As an example of R, $-C_3H_6OCOC(CH_3)=CH_2$ is recited.

Concrete examples of a monomer (M1-2) containing fluorine include perfluoroolefins such as tetrafluoroethylene (TFE), hexafluoropropylene (HFP) and chlorotrifluoroethylene (CTFE); perfluorovinyl ethers such as perfluoro(alkylvinyl ether) (PFAVE), perfluoro(1,3-dioxol), perfluoro(2,2-dimethyl-1,3-dioxol) (PFDD), perfluoro-(2-methylene-4-methyl-1,3-dioxolane) (MMD), and perfluorobutenylvinyl ether (PFBVE); hydrogen atom-containing fluoroolefins such as vinylidene fluoride (VdF), trifluoroethylene, 1,2-difluoroethylene, vinyl fluoride, trifluoropropylene, 3,3,3-trifluoro-2-trifluoromethylpropene, 3,3,3-trifluoropropene, and perfluoro(butyl)ethylene (PFBE); polyfluoroalkyl(meth) acrylates such as 1,1-dihydro perfluorooctyl acrylate (DPFOA), 1,1-dihydro perfluorooctyl methacrylate (DPFOMA), 2-(perfluorooctyl)ethylacrylate (PFOEA), 2-(perfluorooctyl) ethylmethacrylate (PFOEMA), 2-(perfluorohexyl)ethylmethacrylate (PFHEMA), and 2-(perfluorobutyl)ethylmethacrylate (PFBEMA); and fluorostyrenes such as α-fluorostyrene, β-fluorostyrene, α,β-difluorostyrene, β,β-difluorostyrene, α,β,β-trifluorostyrene, α-trifluoromethylstyrene, 2,4,6-tri(trifluoromethyl)styrene, 2,3,4,5,6-pentafluorostyrene, 2,3,4,5,6-pentafluoro-α-methylstyrene, and 2,3,4,5,6-pentafluoro-β-methylstyrene.

When the resin (b) is a urethane resin, the dispersion stabilizer (E) is preferably a urethane resin having a monomer having at least one group of a dimethylsiloxane group and a fluorine-containing functional group as a constitutional unit.

As (M1-1), polysiloxanes having a functional group containing active hydrogen, such as amino-modified silicone, carboxyl-modified silicone, carbinol-modified silicone, and mercapto-modified silicone are preferred. As (M1-2), fluorine group-containing polyols such as 2,2 bis(4-hydroxyphenyl)hexafluoropropane and 3,3,4,4-tetrafluoro-1,6-hexanediol, fluorine compounds having a functional group containing active hydrogen such as fluorine group-containing (poly)amines and fluorine group-containing (poly)thiols, and fluorine group-containing (poly)isocyanates such as bis(isocyanatomethyl)perfluoro propane, bis(isocyanatomethyl) perfluoro butane, bis(isocyanatomethyl)perfluoropentane and bis(isocyanatomethyl)perfluorohexane are preferred.

When the resin (b) has an acid value, it is preferred that the dispersion stabilizer (E) has an amino group from the viewpoint of dispersibility. The acid value of the resin (b) is preferably 1 to 50, more preferably 3 to 40, and most preferably 5 to 30. The amino group may be any of primary, secondary and tertiary, and may be introduced into any positions including the side chain, either one of terminals, both terminals, and both terminals of the side chain of the compound containing a fluorine-containing group and a dimethylsiloxane group.

As the dispersion stabilizer (E), for example, a monomer having a dimethylsiloxane group (or a reactive oligomer) (M1-1), and/or a fluorine-containing monomer (M1-2), and a copolymer with the monomer forming the above resin (b) (for example, a copolymer of methacryl-modified silicone and methyl methacrylate, a copolymer of heptafluorobutyl methacrylate and methyl methacrylate and the like) are preferred. The copolymer may be in any form of random, block and graft forms, however, a block or graft form is preferred.

When the resin (b) has an acid value, it is preferred that the microparticle (A) has an amino group on the particle surface from the viewpoint of dispersion stability. The amino group may be any of primary, secondary and tertiary, and the form of containing an amino group is not particularly limited. For example, a method of making a compound having an amino group be contained in the microparticle (A) by way of dispersion, impregnation or the like, a method using a compound having an amino group as a component forming the microparticle (A), a method of reacting an amino group-containing coupling agent or the like on a surface of the microparticle (A), a method of making an amino group-containing compound be adsorbed to a surface of the microparticle (A) and the like are recited.

The amount of addition of the dispersion stabilizer (E) is preferably 0.01 to 50% by weight, more preferably 0.02 to 40% by weight, and particularly preferably 0.03 to 30% by weight relative to the weight of the resin (b) from the viewpoint of dispersion stability. The range of the weight average molecular weight of the dispersion stabilizer (E) is preferably 100 to 100000, more preferably 200 to 50000, and particularly preferably 500 to 30000. Within these ranges, the dispersion stabilizing effect of (E) improves.

Also in Production Methods (1) and (3), the dispersion stabilizer (E) may be used in the dispersing step.

In the present invention, the microparticle (A) may be dispersed in carbon dioxide (X) by any method, and for example, a method of charging a vessel with (A) and (X) and directly dispersing (A) in (X) by stirring, ultrasonic radiation or the like, and a method of introducing a dispersion liquid in which the microparticle (A) is dispersed in a solvent (T) into (X) are recited.

The weight percentage (% by weight) of the microparticle (A) relative to the weight of carbon dioxide (X) is preferably 50 or less, more preferably 30 or less, and particularly preferably 0.1 to 20. Within these ranges, the resin particle (C1) can be produced efficiently.

As the solvent (T), those similar to the ones mentioned as the solvent (S) are recited. From the dispersibility of the microparticle (A), aliphatic hydrocarbon solvents (decane, hexane, heptane, and the like), and ester solvents (ethyl acetate, butyl acetate, and the like) are preferred.

As to the weight ratio (% by weight) between the microparticle (A) and the solvent (T), although not particularly limited, 50 or less of the microparticle (A) relative to the solvent (T) is preferred, 30 or less is more preferred, and 20 or less is particularly preferred. Within these ranges, the microparticle (A) can be introduced into (X) efficiently.

As a method of dispersing the microparticle (A) in the solvent (T), although not particularly limited, a method of charging the microparticle (A) into the solvent (T) and directly dispersing the microparticle (A) by stirring, ultrasonic radiation or the like, and a method of dissolving the microparticle in the solvent (T) at a high temperature to cause crystallization are recited.

In this manner, a dispersion (X0) in which (A) is dispersed in carbon dioxide (X) is obtained. As the microparticle (A), those having a degree of swelling in the above range, and can be stably dispersed in (X) without being dissolved in (X) are preferred.

For dispersing in (X), the solution (L) of the resin (b) preferably has an appropriate viscosity, preferably 100 Pa·s or less, and more preferably 10 Pa·s or less from the viewpoint of the particle size distribution. The solubility of the resin (b) in (X) is preferably 3% or less, and more preferably 1% or less.

The SP value of the resin (b) is preferably 8 to 16, and more preferably 9 to 14.

In the present invention, the resin particle (B) containing the resin (b) may further contain other additives (pigments, fillers, antistatic agents, coloring agents, mold release agents, charge controllers, UV absorbers, antioxidants, blocking preventing agents, heat-resistant stabilizers, flame retardants, and the like). As a method of adding other additives to the resin particle (B), it is preferred to achieve dispersion by preliminarily mixing the resin (b) and the additives, and then adding the mixture to (X).

In the present invention, the solution (L) of the resin (b) may be dispersed in the dispersion (X0) in which the microparticle (A) is dispersed in (X) by any method. As a concrete example, a method of dispersing the solution (L) of the resin (b) by a stirrer, a disperser or the like, a method of forming a droplet by spraying the solution (L) of the resin (b) into the dispersion (X0) in which (A) is dispersed in carbon dioxide (X) via a spray nozzle, and bringing the resin in the droplet into a supersaturated state, thereby allowing precipitation of the resin particle (known as ASES: Aerosol Solvent Extraction System), a method of obtaining a particle by simultaneously blowing out the solution (L), the solution (L0), the precursor (b0) of the resin (b), and the dispersion (X0) together with a high-pressure gas, an entrainer and the like from separate tubes of coaxial multiple tubes (double tubes, triple tubes, and the like), thereby promoting division by application of external stress onto the droplet (known as SEDS: Solution Enhanced Dispersion by Supercritical Fluids), and a method of ultrasonic radiation are recited. The same applies also to the solution (L0) of the precursor (b0) of the resin (b) and the precursor (b0) of the resin (b) in Production Methods (3) and (1).

In this manner, the solution (L) of the resin (b) is dispersed in the dispersion (X0) in which (A) is dispersed in carbon dioxide (X), and the particle of the dispersed resin (b) is allowed to grow while the microparticle (A) is adsorbed to the surface, and thus the resin particle (C1) in which the microparticle (A) is fixed to a surface of the resin particle (B1) containing the resin (b) and the solvent (S) is formed. A dispersion in which (C1) is dispersed in (X) is referred to as a dispersion (X1).

The dispersion (X1) preferably has a single phase. In other words, when the solution (L) of the resin (b) is used, it is not preferred that the phase of the solvent (S) separates into other phases than the phase containing carbon dioxide (X) in which (C1) is dispersed. Therefore, it is preferred to set the amount of the solution (L) of (b) relative to the dispersion (X0) so that a solvent phase will not separate off. For example, 90% by weight or less is preferred, 5 to 80% by weight is further preferred, and 10 to 70% by weight is particularly preferred, relative to (X0).

When the solution (L) of the resin (b), or the solution (L0) of the precursor (b0) of Production Method (3) is used, an amount of (S) contained in the resin particle (B1) containing the resin (b) and the solvent (S) is preferably 10 to 90% by weight, and more preferably 20 to 70% by weight.

The weight ratio (b):(X) between the resin (b) and carbon dioxide (X) is preferably 1:(0.1 to 100), more preferably 1:(0.5 to 50), and particularly preferably 1:(1 to 20). The same applies also to the weight ratio between the precursor (b0) and carbon dioxide (X) in Production Methods (1) and (3).

In the present invention, liquid carbon dioxide represents carbon dioxide in the temperature and pressure condition of the part surrounded by a gas-liquid boundary passing a triple point (temperature=−57° C., pressure=0.5 MPa) of carbon dioxide and a critical point (temperature=31° C., pressure=7.4 MPa) of carbon dioxide, an isothermal line of the critical temperature and a solid-liquid boundary on a phase chart represented by a temperature axis and a pressure axis of carbon dioxide, while supercritical carbon dioxide represents carbon dioxide in the temperature and pressure condition of higher than the critical temperature (provided that the pressure represents the total pressure in the case of a mixed gas of two or more components).

In Production Method (2) of the present invention, an operation conducted in carbon dioxide (X) is preferably carried out at the temperature as will be described below. To be more specific, for preventing carbon dioxide from transitioning to the solid phase in piping under a reduced pressure and from clogging the channel, it is preferably 30° C. or higher, and for preventing heat deterioration of the microparticle (A), the resin particle (B1), and the resin particle (C1), it is preferably 200° C. or lower. Furthermore, 30 to 150° C. is preferred, 34 to 130° C. is more preferred, 35 to 100° C. is particularly preferred, and 40° C. to 80° C. is most preferred. The same also applies to temperatures of the dispersion (X0) and the dispersion (X1). The same also applies to the cases of Production Methods (1) and (3). In Production Methods (1) to (3) of the present invention, an operation conducted in carbon dioxide (X) may be carried out at a temperature equal to or higher than or lower than the Tg or the melting point of the microparticle (A), however, it is preferably carried out at a temperature lower than the Tg or the melting point.

In Production Method (2) of the present invention, an operation conducted in carbon dioxide (X) is preferably carried out at a pressure as will be described below. That is, for satisfactorily dispersing the resin particle (C1) in (X), the pressure is preferably 7 MPa or higher, and from the viewpoints of the installation cost and the operation cost, it is preferably 40 MPa or less. It is more preferably 7.5 to 35 MPa, further preferably 8 to 30 MPa, particularly preferably 8.5 to 25 MPa, and most preferably 9 to 20 MPa. The same applies to the pressure in vessels where the dispersion (X0) and the dispersion (X1) are formed. The same applies also to the cases of Production Methods (1) and (3).

In Production Method (2) of the present invention, the temperature and the pressure of an operation conducted in carbon dioxide (X) are preferably set so that the resin (b) is not dissolved in (X) and (b) can aggregate and unite. Usually, a target dispersion tends to hardly dissolve in (X) at a lower temperature and a lower pressure, and (b) tends to aggregate and unite at a higher temperature and a higher pressure. The same also applies to the dispersion (X0) and the dispersion (X1). The same also applies to the cases of Production Methods (1) and (3).

In carbon dioxide (X) of the present invention, other substances (e) may be appropriately contained for adjusting physical property values (viscosity, diffusion coefficient, dielectric constant, solubility, boundary tension, and the like)

as a dispersion medium, and as such substances, for example, inert gases such as nitrogen, helium, argon and air, and the like are recited.

The weight percentage of carbon dioxide (X) in the total amount of (X) and the other substances (e) in the present invention is preferably 70% or more, more preferably 80% or more, and particularly preferably 90% or more.

From the dispersion (X1) in which the resin particle (C1) is dispersed, carbon dioxide (X) is removed usually by pressure reduction, to obtain the resin particle (C) of the present invention. At this time, the pressure reduction may be achieved stepwise by providing vessels with independently controlled pressures at multiple stages, or the pressure reduction may be conducted at once to normal temperature and normal pressure. The method of capturing the resin particles to be obtained is not particularly limited, and a method of separating the particles by a filter, and a method of centrifuging the particles by a cyclone or the like are exemplified. Resin particles may be collected after pressure reduction, or pressure reduction may be effected after once collecting them under high pressure prior to pressure reduction. For drawing out resin particles from under high pressure in the case of reducing the pressure after collecting them under high pressure, the pressure of a capturing vessel may be reduced by a batch operation, or a continuous draw out operation may be conducted using a rotary valve.

When the microparticle (A) contains the crystalline resin (a1), after forming the resin particle (C1), as an additional step, a step of heating the product to preferably the melting point minus 50° C. or higher, more preferably the melting point minus 10° C. or higher, or further preferably the melting point or higher of the crystalline resin (a1), thereby melting the microparticle (A) attached to a surface of the resin particle (B), and fixing the microparticle (A) to a surface of the resin particle (B), or forming a film derived from the microparticle (A) to produce a resin particle (C2) may be conducted as necessary. From the viewpoint of suppressing aggregation of (C2), the heating time is preferably 0.01 to 1 hour, and more preferably 0.05 to 0.7.

In the resin particle (C) of the present invention obtained by Production Methods (1) to (3) of the present invention, the microparticle (A) is temporarily fixed to a surface of the resin particle (B) or (B1), however, when the crystalline resin (a1) is used as (a), the microparticle (A) can be made into a film and a film of (A) may be formed on a surface of (B) during the production operation depending on the composition of (a) and the resin (b), and the kind of the solvent (s) or (T).

The resin particle (C) of the present invention may be any of the one produced by fixing the microparticle (A) to a surface of the resin particle (B), the one produced by forming a film derived from (A) on a surface of the resin particle (B), and the one produced by making part of (A) into a film on a surface of the resin particle (B).

Here, the surface condition and the shape of the resin particle (C) of the present invention may be observed, for example, in a photograph magnifying the surface of the resin particle at a magnification of 10,000 or 30,000 times using a scanning electron microscope (SEM).

After forming the resin particle (C1) [including the case of the resin particle (C2)], it is preferred to conduct an additional step of removing or reducing the solvent (S) as necessary. To be more specific, when the solvent (S) is contained in the dispersion (X1) in which (C1) is dispersed in (X), a solvent dissolved in (X1) will condense if the pressure of the vessel is reduced directly. This may lead to the problem that the resin particle (C1) is dissolved again, or the resin particles (C1) unite during capturing. As a preferred method of removing or reducing the solvent, for example, carbon dioxide [preferably carbon dioxide (X)] is further mixed with the dispersion (X1) obtained by dispersing the solution (L) of the solvent (S) of the resin (b) to extract the solvent (S) into a phase of carbon dioxide from the resin particle (C1), and then carbon dioxide containing the solvent (S) is replaced with carbon dioxide not containing the solvent (S) [preferably, carbon dioxide (X)], followed by pressure reduction.

As a method of mixing the dispersion (X1) in which the resin particle (C1) is dispersed in carbon dioxide (X) with carbon dioxide, carbon dioxide having higher pressure than (X1) may be added, or (X1) may be added to carbon dioxide having lower pressure than (X1), with the latter being preferred from the viewpoint of easiness of continuous operation. The amount of carbon dioxide to be mixed with (X1) is preferably 1 to 50 times, more preferably 1 to 40 times, and most preferably 1 to 30 times the volume of (X1) from the viewpoint of preventing uniting of the resin particles (C1). It is possible to prevent the resin particles (C1) from uniting by removing or reducing the solvent contained in the resin particle (C1) and then removing carbon dioxide as described above.

As a method of replacing carbon dioxide containing the solvent (S) with carbon dioxide not containing the solvent (S), a method of allowing carbon dioxide to flow until the solvent (S) is completely removed while keeping the pressure after temporarily capturing the resin particle (C1) with a filter or a cyclone is recited. The amount of carbon dioxide that is allowed to flow is preferably 1 to 100 times, more preferably 1 to 50 times, and most preferably 1 to 30 times the volume of (X1) from the viewpoint of removing the solvent from the dispersion (X1).

Next, Production Method (1) will be specifically described.

In the present invention, as the precursor (b0) of the resin (b), any one capable of becoming the resin (b) as a result of chemical reaction may be used without any particular limitation, and for example, when the resin (b) is a vinyl resin, as (b0), vinyl monomers as described above (which may be used singly or as a mixture) can be recited, and when the resin (b) is a condensation resin (for example, a polyurethane resin, an epoxy resin, or a polyester resin), a combination of a prepolymer (α) having a reactive group and a curing agent (β) is exemplified as (b0).

When a vinyl monomer is used as the precursor (b0), (b0) may contain a commonly used initiator. As the initiator, a peroxide polymerization initiator (I), an azo polymerization initiator (II) and the like are recited. Also a redox polymerization initiator (III) may be formed by using both the peroxide polymerization initiator (I) and a reducing agent. Further, two or more kinds of (I) to (III) may be used in combination.

When using the above initiator, it is preferred to preliminarily mix the initiator with a monomer before dispersing (b0) in carbon dioxide (X). The polymerization temperature is preferably 40 to 100° C., and more preferably 60 to 90° C.

As the precursor (b0), a combination of the prepolymer (a) having a reactive group and the curing agent (β) may be used. Here, the "reactive group" means a group capable of reacting with the curing agent (β). As a combination of a reactive group in the reactive group-containing prepolymer (α) and the curing agent (β), the following (1), (2), and the like are recited.

(1): A combination in which a reactive group in the reactive group-containing prepolymer (α) is a functional group (α1) capable of reacting with an active hydrogen compound, and the curing agent (β) is an active hydrogen group-containing compound (β1).

(2): A combination in which a reactive group in the reactive group-containing prepolymer (α) is an active hydrogen-containing group (α2) and the curing agent (β) is a compound (β2) capable of reacting with an active hydrogen-containing group.

In the above combination (1), as the functional group (α1) capable of reacting with an active hydrogen compound, an isocyanate group (α1a), a blocked isocyanate group (α1b), an epoxy group (α1c), an acid anhydride group (add) and an acid halide group (α1e) are recited. Among these, (α1a), (α1b) and (α1c) are preferred, and (α1a) and (α1b) are particularly preferred. The blocked isocyanate group (α1b) means an isocyanate group blocked with a blocking agent. As the blocking agent, oximes [acetoxime, methylisobutylketoxime, diethylketoxime, cyclopentanoneoxime, cyclohexanoneoxime, methylethylketoxime and the like]; lactams [γ-butyrolactam, ε-caprolactam, γ-valerolactam, and the like]; aliphatic alcohols having 1 to 20 carbon atoms [ethanol, methanol, octanol, and the like]; phenols [phenol, m-cresol, xylenol, nonylphenol, and the like]; active methylene compounds [acetylacetone, ethyl malonate, ethyl acetoacetate, and the like]; basic nitrogen-containing compounds [N,N-diethylhydroxylamine, 2-hydroxypyridine, pyridine N-oxide, 2-mercaptopyridine, and the like]; and a mixture of two or more kinds of these can be recited. Among these, oximes are preferred, and methylethylketoxime is particularly preferred.

As a backbone of the reactive group-containing prepolymer (α), a polyether (αw), a polyester (αx), an epoxy resin (αy), a polyurethane (αz) and the like are recited. Among these, (αx), (αy) and (αz) are preferred, and (αx) and (αz) are particularly preferred. As the polyether (αw), polyethylene oxide, polypropylene oxide, polybutylene oxide, polytetramethylene oxide and the like are recited. As the polyester (αx), a polycondensate of the diol (11) and the dicarboxylic acid (13), a polylactone (a ring-opening polymer of ε-caprolactone) and the like are recited. As the epoxy resin (αy), addition condensates of bisphenols (bisphenol A, bisphenol F, bisphenol S, and the like) and epichlorohydrin, and the like are recited. As the polyurethane (αz), a polyadduct of the diol (11) and the polyisocyanate (15), a polyadduct of the polyester (αx) and the polyisocyanate (15), and the like are recited.

As a method of adding a reactive group to the polyester (αx), the epoxy resin (αy), the polyurethane (αz) and the like, (1): a method of making a functional group of a constituent remain in a terminal end by using one of two or more constituents excessively, (2): a method of making a functional group of a constituent remain in a terminal end by using one of two or more constituents excessively, and further letting a compound having a functional group reactive with the remaining functional group and a reactive group react, and the like are recited. In the above method (1), a hydroxyl group-containing polyester prepolymer, a carboxyl group-containing polyester prepolymer, an acid halide group-containing polyester prepolymer, a hydroxyl group-containing epoxy resin prepolymer, an epoxy group-containing epoxy resin prepolymer, a hydroxyl group-containing polyurethane prepolymer, an isocyanate group-containing polyurethane prepolymer, and the like are obtained. As to the ratio of constituents, for example, in the case of the hydroxyl group-containing polyester prepolymer, the ratio between a polyol and a polycarboxylic acid is preferably 2/1 to 1/1, more preferably 1.5/1 to 1/1, and particularly preferably 1.3/1 to 1.02/1 by the molar ratio [OH]/[COOH] between the hydroxyl group [OH] and the carboxyl group [COOH]. Also in the case of a prepolymer having a different backbone or a different terminal group, only the constituents vary but the ratio is as described above. In the above method (2), by reacting a polyisocyanate on the prepolymer obtained by the above method (1), an isocyanate group-containing prepolymer is obtained, by reacting a blocked polyisocyanate, a blocked isocyanate group-containing prepolymer is obtained, by reacting a polyepoxide, an epoxy group-containing prepolymer is obtained, and by reacting a polyacid anhydride, an acid anhydride group-containing prepolymer is obtained. As to an amount of use of a compound having a functional group and a reactive group, for example, when an isocyanate group-containing polyester prepolymer is obtained by reacting a polyisocyanate on a hydroxyl group-containing polyester, the proportion of the polyisocyanate is preferably 5/1 to 1/1, more preferably 4/1 to 1.2/1, and particularly preferably 2.5/1 to 1.5/1 by the molar ratio [NCO]/[OH] between the isocyanate group [NCO] and the hydroxyl group [OH] of the hydroxyl group-containing polyester. Also in the case of a prepolymer having a different backbone or a different terminal group, only the constituents vary, but the ratio is as described above.

The number of the reactive groups contained per one molecule in the reactive group-containing prepolymer (α) is usually 1 or more, preferably 1.5 to 3, and more preferably 1.8 to 2.5 on average. Within these ranges, the molecular weight of the cured product obtainable by reaction with the curing agent (β) is increased. The number average molecular weight of the reactive group-containing prepolymer (α) is preferably 500 to 30,000, more preferably 1,000 to 20,000, and particularly preferably 2,000 to 10,000. The weight average molecular weight of the reactive group-containing prepolymer (a) is 1,000 to 50,000, preferably 2,000 to 40,000, and more preferably 4,000 to 20,000. The viscosity of the reactive group-containing prepolymer (a) at 100° C. is preferably 2,000 poises or less, and more preferably 1,000 poises or less. A viscosity of 2,000 poises or less is preferred in that the resin particle (C) having a sharp particle size distribution is obtained with a small amount of a solvent.

As the active hydrogen group-containing compound (β1), a polyamine (β1a), a polyol (β1b), a polymercaptan (β1c) and water (β1d) that may be blocked by an eliminable compound are recited. Among these, (β1a), (β1b) and (β1d) are preferred, (β1a) and (β1d) are more preferred, and the blocked polyamine (β1a) and (β1d) are particularly preferred. As (β1a), those similar to the ones mentioned as the polyamine (16) are exemplified. As (β1a), 4,4'-diaminodiphenylmethane, xylylenediamine, isophoronediamine, ethylenediamine, diethylenetriamine, triethylenetetramine, hexamethylenediamine and mixtures thereof are preferred.

As an example in the case where (β1a) is a polyamine blocked by an eliminable compound, ketimine compounds obtained from the above polyamines and ketones having 3 to 8 carbon atoms (acetone, methyl ethyl ketone, methyl isobutyl ketone, and the like), and aldimine compounds obtained from aldehyde compounds having 2 to 8 carbon atoms (formaldehyde, acetaldehyde), enamine compounds, and oxazolidine compounds are recited.

As the polyol (β1b), the ones mentioned as the diol (11) and the polyol (12) are exemplified. The diol (11) alone, or a mixture of the diol (11) and a small amount of the polyol (12) is preferred.

As the polymercaptan (β1c), ethylenedithiol, 1,4-butanedithiol, 1,6-hexanedithiol, and the like are recited.

A reaction terminator (βs) may be used together with the active hydrogen group-containing compound (β1) as necessary. By using a certain proportion of the reaction terminator (β1) together, it is possible to adjust (b) to have a predetermined molecular weight. As the reaction terminator (βs), monoamines (diethylamine, dibutylamine, butylamine, laurylamine, monoethanolamine, diethanolamine, and the like); blocked monoamines (a ketimine compound, and the like); monools (methanol, ethanol, isopropanol, butanol, phenol; monomercaptans (butylmercaptan, laurylmercaptan, and the like); monoisocyanates (laurylisocyanate, phenylisocyanate, and the like); monoepoxides (butylglycidylether, and the like) and the like are recited.

As the active hydrogen-containing group ($\alpha 2$) in the reactive group-containing prepolymer ($\alpha$) in the above combination (2), an amino group ($\alpha 2a$), a hydroxyl group (an alcoholic hydroxyl group and a phenolic hydroxyl group) ($\alpha 2b$), a mercapto group ($\alpha 2c$), a carboxyl group ($\alpha 2d$) and organic groups ($\alpha 2e$) obtained by blocking these groups with an eliminable compound, and the like are recited. Among these, the organic groups ($\alpha 2e$) obtained by blocking ($\alpha 2a$), ($\alpha 2b$) and an amino group with an eliminable compound are preferred, and ($\alpha 2b$) is particularly preferred. As an organic group in which an amino group is blocked by an eliminable compound, those similar to the ones mentioned as ($\beta 1a$) are exemplified.

As the compound ($\beta 2$) capable of reacting with an active hydrogen-containing group, a polyisocyanate ($\beta 2a$), a polyepoxide ($\beta 2b$), a polycarboxylic acid ($\beta 2c$), a polyacid anhydride ($\beta 2d$), a polyacid halide ($\beta 2e$) and the like are recited. Among these, ($\beta 2a$) and ($\beta 2b$) are preferred, and ($\beta 2a$) is more preferred.

As the polyisocyanate ($\beta 2a$), those similar to the ones mentioned as the polyisocyanate (15) are exemplified, and preferred ones are also similar.

As the polyepoxide ($\beta 2b$), those similar to the ones mentioned as the polyepoxide (18) are exemplified, and preferred ones are also similar.

As the polycarboxylic acid ($\beta 2c$), a dicarboxylic acid ($\beta 2c$-1) and a tri- or more-valent polycarboxylic acid ($\beta 2c$-2) are recited, and ($\beta 2c$-1) alone, and a mixture of ($\beta 2c$-1) and a small amount of ($\beta 2c$-2) are preferred. As the dicarboxylic acid ($\beta 2c$-1), those similar to the ones mentioned as the dicarboxylic acid (13), and as the polycarboxylic acid, those similar to the ones mentioned as the polycarboxylic acid (14) are exemplified, and preferred ones are also similar.

As the polycarboxylic acid anhydride ($\beta 2d$), a pyromellitic anhydride and the like are recited. As the polyacid halide ($\beta 2e$), acid halides of the above ($\beta 2c$) (acid chlorides, acid bromides, acid iodides) and the like are recited. Further, the reaction terminator ($\beta s$) may be used together with ($\beta 2$) as necessary.

The proportion of the curing agent ($\beta$) is preferably 1/2 to 2/1, more preferably 1.5/1 to 1/1.5, and particularly preferably 1.2/1 to 1/1.2 by an equivalent ratio [$\alpha$]/[$\beta$] of an equivalent [$\alpha$] of the reactive group in the reactive group-containing prepolymer ($\alpha$) and an equivalent [$\beta$] of the active hydrogen-containing group in the curing agent ($\beta$). When the curing agent ($\beta$) is water ($\beta 1d$), water is regarded as a bivalent active hydrogen compound.

When a combination of the prepolymer ($\alpha$) having a reactive group and the curing agent ($\beta$) is used as the precursor (b0), a method of reacting (b0) in the dispersion (X0) in which the microparticle (A) is dispersed in carbon dioxide (X) is not particularly limited, however, a method of mixing ($\alpha$) and ($\beta$) immediately before dispersing (b0) in (X0), and allowing to them react at the same time with dispersing is preferred. The reaction time is selected according to the reactivity by a combination of the structure of the reactive group in the prepolymer ($\alpha$) and the curing agent ($\beta$), and it is preferably 5 minutes to 24 hours. The reaction may be completed in (X0) before pressure reduction, or the reaction may be allowed to a certain extent in (X0), and completed by aging in a thermostatic bath after reducing the pressure and drawing (C) out. Also, a publicly known catalyst may be used as necessary. Concretely, for example, in the case of reaction of an isocyanate and an active hydrogen compound, dibutyltin laurate, dioctyltin laurate and the like are recited. The reaction temperature is preferably 30 to 100° C., and more preferably 40 to 80° C.

The resin (b) obtained by reaction of the precursor (b0) consisting of the reactive group-containing prepolymer ($\alpha$) and the curing agent ($\beta$) is a constituent of the resin particle (B) and the resin particle (C). The weight average molecular weight of the resin (b) obtained by reaction of the reactive group-containing prepolymer ($\alpha$) and the curing agent ($\beta$) is preferably 3,000 or larger, more preferably 3,000 to 10000000, and particularly preferably 5000 to 1000000.

Further, at the time of reaction of the reactive group-containing prepolymer ($\alpha$) and the curing agent ($\beta$), a polymer that is not reactive with the reactive group-containing prepolymer ($\alpha$) and the curing agent ($\beta$) [a so-called dead polymer] may be contained in the system. In this case, (b) is a mixture of a resin obtained by reaction of the reactive group-containing prepolymer ($\alpha$) and the curing agent ($\beta$), and an unreacted resin.

Production Method (1) is same as Production Method (2) except for the above items and that the precursor (b0) is reacted at the time of dispersing using the precursor (b0) of the resin (b) in place of the solution (L) in which the resin (b) is dissolved in the solvent (S).

Production Method (3) will be specifically described.

It is same as Production Method (2) except that the solution (L0) of the precursor (b0) of the resin (b) in the solvent (S) is used in place of the solution (L) of the resin (b) in the solvent (S), and the precursor (b0) is reacted at the time of dispersing.

According to the above Production Methods (1) to (3), it is possible to produce the resin particle (C) of the present invention containing substantially no surface-active substance having a hydrophilic group. Here, as the surface-active substance having a hydrophilic group, an anion surfactant (S-1), a cation surfactant (S-2), an ampholytic surfactant (S-3), a nonionic surfactant (S-4) and the like are recited.

Concrete examples of these surfactants are found in International Publication WO03/106541 pamphlet. Usually, a resin particle produced by using a surface-active substance having a hydrophilic group in an aqueous solvent substantially contains the surface-active substance having a hydrophilic group.

As a method of analyzing that a resin particle contains substantially no surface-active substance having a hydrophilic group, publicly known surface wettability evaluation (according to Journal of Japan Society of Colour Material, vol. 73[3], 2000, pp. 132 to 138) is recited. An evaluation method of surface wettability is as follows. Concretely, 0.1 g of resin particles is introduced into a 100-mL beaker, and added with 20 mL of ion exchange water, stirred by a magnetic stirrer to make the resin particles float on the liquid surface, and then acetone is added dropwise little by little, and the acetone weight (Wa) and the water weight (Ww) at the time of disappearance of the resin particles floating on the surface are determined to three significant figures, and the solubility parameter of the resin particle surface ($\delta m$) is calculated from the formula (I).

$$\delta m = (9.75 \times Wa + 23.43 \times Ww)/(Wa + Ww) \quad (1)$$

When the solubility parameter of the resin particle surface ($\delta m$) is 9.8 to 21, preferably 9.8 to 20, it is regarded that the resin particle contains substantially no surface-active substance having a hydrophilic group. When the δm is 9.8 to 21, the humidity resistant keeping property of the resin particle is good, and electrical characteristics, fluidity and the fixing property as toner under high humidity are good. In the present measurement method, δm less than 9.8 is unmeasurable.

The resin particle (C) can be provided with desired irregularities on a surface of the particle by varying the particle size between the microparticle (A) and the resin particle (B), and the surface coverage percentage of the resin particle (B) by the microparticle (A) or a film derived from (A). Further, a porous body having air bubbles inside is obtained by controlling the temperature and the pressure at the time of pressure reduction, so that a specific surface area can be increased. For improving powder fluidity, it is preferred that the BET specific surface area of the resin particle is 0.5 to 5.0 m$^2$/g. The BET specific surface area is measured by using a specific surface area meter, for example, QUANTASORB (manufactured by Yuasa Ionics Inc.) (measurement gas: He/Kr=99.9/0.1 vol %, calibration gas: nitrogen). Likewise, from the viewpoint of powder fluidity, it is preferred that the surface average center line roughness Ra of the resin particle (C) of the present invention is 0.01 to 0.8 μm. The Ra is an arithmetic mean value of the absolute value of the variation between the roughness curve and its center line, and is measured, for example, by a scanning probe microscope system (manufactured by TOYO Corporation).

The resin particle (C) obtained by the production method of the present invention exhibits a sharp particle size distribution, and usually does not contain a water-soluble surface-active substance and an ionic substance, so it is hydrophobic. Therefore, the resin particle (C) of the present invention is useful for electrophotographic toner. As other use applications, it is also useful as an additive for paints, an additive for adhesives, an additive for cosmetics, an additive for paper coating, a resin for slush molding, a powdery paint, a spacer for production of electronic components, a carrier for catalysts, electrostatic recording toner, electrostatic printing toner, a standard particle for electronic measuring devices, a particle for electronic paper, a carrier for medical diagnosis, a chromatograph filler, a particle for electric viscous fluids, and the like.

In the resin particle (C) of the present invention, when the microparticle (A) contains the crystalline resin (a1) having a melting point of 50 to 110° C., it is particularly useful for electrophotographic toner because the effects that it is excellent in low temperature fixing property and heat resistant keeping property are realized.

Among the crystalline resins (a1) having a melting point of 50 to 110° C., (a11), (a12), (a13) and (a14) are particularly preferred.

Electrophotographic toner for use in an electrophotographic process is temporarily adhered, for example, to an image carrier such as a photoconductor on which an electrostatic charge image is formed in a developing step, then transferred to a transfer medium such as transfer paper from the photoconductor in a transferring step, and then fixed to a paper face in a fixing step. As the electrophotographic toner, for imparting flow characteristics, resin particles for toner are usually mixed with an inorganic powder or the like of various metal oxides or the like before use, and such an inorganic powder or the like is called an external additive. As the electrophotographic toner of the present invention, the one obtained by adding an external additive to the resin particle of the present invention is preferred.

As the external additive, for example, silicon dioxide (silica), titanium dioxide (titania), aluminum oxide, zinc oxide, magnesium oxide, cerium oxide, iron oxide, copper oxide, tin oxide, and the like are known. A silica microparticle that is hydrophobized by reacting a silica or titanium oxide microparticle with an organic silicon compound such as dimethyldichlorosilane, hexamethyldisilazane, or silicone oil and replacing a silanol group on a surface of the silica microparticle with an organic group is preferably used.

From the viewpoint of realizing both a fixing property and fluidity, although not particularly limited, an amount of use (% by weight) of the external additive is preferably 0.01 to 5, more preferably 0.1 to 4, and particularly preferably 0.5 to 3, relative to the weight of the resin particles for electrophotographic toner.

The electrophotographic toner of the present invention may be produced by adding and mixing an external additive to the resin particles for electrophotographic toner of the present invention.

EXAMPLES

In the following, the present invention will be further described by way of examples, however, the present invention is not limited to these examples. In the following description, "part(s)" represents part(s) by weight, and "%" represents % by weight.

The degree of swelling, crystallinity, number average molecular weight, melting point, glass transition temperature, and volume average particle size were measured by the following methods.

<Measurement Method of Degree of Swelling>

A sample (5 mg) was picked, and the weight at which supercritical carbon dioxide at 40° C. and 10 MPa penetrated the sample was measured by a magnetic floating balance (MSB-SCC•SCW manufactured by BEL Japan, Inc.), and the measured weight was divided by the weight of the sample, to determine the degree of swelling (%).

<Measurement Method of Crystallinity>

A sample (5 mg) was picked and put in an aluminum pan, and the melting heat quantity (ΔHm (J/g)) was determined from the area of the endothermic peak while the temperature was varied from room temperature at a temperature rising speed of 20° C./min using DSC (differential scanning calorimetry) (measuring device: RDC220, manufactured by SII Nano Technology Inc.). Based on the measured ΔHm, the crystallinity (%) was calculated by the following formula.

Crystallinity=(melting heat quantity/$a$)×100

In the above formula, "a" is measured in the following manner.

The melting heat quantity of a resin which is to be an authentic sample having the same composition as the resin to be measured is measured by DSC, and the crystallinity is measured by a measurement method according to JIS K 0131 (1996) (X-ray diffraction analysis general rule 13 crystallinity measurement, (2) Absolute method). Setting coordinates of the melting heat quantity on the vertical axis and the crystallinity on the horizontal axis, data of the authentic sample is plotted, and a straight line is drawn from that point and the original point, and extrapolation was effected so that the crystallinity is 100%. The value of the melting heat quantity thus determined is a.

<Measurement Method of Number Average Molecular Weight (Mn)>

Each sample was dissolved in tetrahydrofuran at a concentration of 2.5 g/L, and measurement was conducted by GPC using polystyrene as a standard substance.

GPC model: HLC-8120GPC, manufactured by TOSOH CORPORATION

Column: TSK gel GMHXL)×2+TSK gel Multipore HXL-M (manufactured by TOSOH CORPORATION)

<Measurement Method of Melting Point>

A sample (5 mg) was picked and put in an aluminum pan, and the temperature (° C.) of the endothermic peak by crystal melting was determined by DSC (differential scanning calorimetry) (measuring device: RDC220, manufactured by SII Nano Technology Inc.) at a temperature rising speed of 10° C. per minute.

<Measurement Method of Glass Transition Temperature (Tg)>

Each 5 mg of a sample was weighed, and the glass transition temperature was measured by DSC (differential scanning calorimetry) (measuring device: RDC220, manufactured by SII Nano Technology Inc.) at a temperature rising speed of 10° C. per minute.

<Measurement Method of Volume Average Particle Size>

After dispersing 5 mg of a sample in 10 g of ion exchange water, measurement was conducted by Multisizer III (manufactured by Beckman Coulter, Inc.).

Production Example 1

Preparation of Resin (b-1)

In a reaction vessel equipped with a cooling tube, a stirrer and a nitrogen introducing tube, 831 parts of 1,2-propylene glycol (hereinafter, referred to as propylene glycol), 703 parts of terephthalic acid, 47 parts of adipic acid, and 0.5 parts of tetrabutoxytitanate as a condensation catalyst were charged, and allowed to react for 8 hours under a nitrogen gas flow at 180° C. while generated water was distilled off. Then the reaction was allowed for 4 hours while the temperature was gradually elevated to 230° C. and generated propylene glycol and water were distilled off under a nitrogen gas flow. The reaction was further allowed under a reduced pressure of 5 to 20 mmHg, and the reaction was cooled to 180° C. when the softening point reached 87° C., and further added with 24 parts of trimellitic anhydride and 0.5 parts of tetrabutoxytitanate and allowed to react for 90 minutes, and then the product was taken out. The amount of the collected propylene glycol was 442 parts. The resin taken out was ground into particles after being cooled to room temperature, to obtain a polyester resin (b-1). This resin had an Mn of 1900 and a Tg of 45° C.

Production Example 2

Preparation of Resin (b-2)

In a reaction vessel equipped with a cooling tube, a stirrer and a nitrogen introducing tube, 729 parts of propylene glycol, 683 parts of terephthalic acid, 67 parts of adipic acid, 38 parts of trimellitic anhydride and 0.5 parts of tetrabutoxytitanate as a condensation catalyst were charged, and allowed to react for 8 hours under a nitrogen gas flow at 180° C. while generated water was distilled off. Then the reaction was allowed for 4 hours while the temperature was gradually elevated to 230° C. and generated propylene glycol and water were distilled off under a nitrogen gas flow. The reaction was further allowed under a reduced pressure of 5 to 20 mmHg. The amount of the collected propylene glycol was 172 parts. The product was taken out when the softening point reached 160° C., cooled to room temperature, and then ground into particles, to obtain a polyester resin (b-2). This resin had an Mn of 5700 and a Tg of 63° C.

Production Example 3

Preparation of Resin (b-3)

In an autoclave equipped with a stirring rod and a thermometer, 24 parts of xylene was charged, and 2,000 parts of mixed monomers of butyl acrylate/methyl methacrylate/styrene/2-ethylhexyl acrylate (25% by weight/33% by weight/40% by weight/2% by weight) and 1 part of a polymerization catalyst were added dropwise over 3 hours at 170° C. to promote polymerization. Volatile materials were removed at normal pressure while the temperature was elevated to 180° C., and the pressure was switched to a reduced pressure when the temperature reached 180° C. and volatile materials were removed over 2 hours at a reduced pressure, to obtain a vinyl resin (b-3). This resin had an Mn of 10,500 and a Tg of 62° C.

Production Example 4

Preparation of Resin Solution (L-1)

In a vessel equipped with a stirrer, a solvent (S-1) which is a mixed solvent consisting of 490 parts of acetone, 175 parts of methanol, and 35 parts of ion exchange water, 228 parts of the resin (b-1) obtained in Production Example 1, 57 parts of the resin (b-2) obtained in Production Example 2, and 15 parts of carbon black were charged and stirred until the resin (b-1) and the resin (b-2) were completely dissolved, to obtain a resin solution (L-1). As to the solvent (S-1), the weight of the insoluble content of the resin (b) relative to the weight of the resin (b) in an equivalent weight mixture of the resin (b) and the solvent (S-1) in a standard condition was 0.1% by weight or less, and the SP value of the solvent (S-1) was 11.8.

Production Example 5

Preparation of Resin Solution (L-2)

In a vessel equipped with a stirrer, a solvent (S-2) which is a mixed solvent consisting of 450 parts of acetone and 50 parts of ion exchange water, 228 parts of the resin (b-1) obtained in Production Example 1, 57 parts of the resin (b-2) obtained in Production Example 2, and 15 parts of carbon black were charged and stirred until the resin (b-1) and the resin (b-2) were completely dissolved, to obtain a resin solution (L-2). As to the solvent (S-2), the weight of the insoluble content of the resin (b) relative to the weight of the resin (b) in an equivalent weight mixture of the resin (b) and the solvent (S-2) in a standard condition was 0.1% by weight or less, and the SP value of the solvent (S-2) was 11.3.

Production Example 6

Preparation of Resin Solution (L-3)

In a vessel equipped with a stirrer, a solvent (S-3) which is a mixed solvent consisting of 490 parts of acetone and 210 parts of methanol, 280 parts of the resin (b-3) obtained in Production Example 3, and 15 parts of carbon black were charged and stirred until the resin (b-3) was completely dissolved, to obtain a resin solution (L-3). As to the solvent (S-3), the weight of the insoluble content of the resin (b) relative to the weight of the resin (b) in an equivalent weight mixture of the resin (b) and the solvent (S-3) in a standard condition was 0.1% by weight or less, and the SP value of the solvent (S-3) was 11.3.

Production Example 7

Preparation of Resin Solution (L-4)

In a vessel equipped with a stirrer, 700 parts of a solvent (S-4) which is a mixed solvent consisting of 560 parts of acetone, 70 parts of ion exchange water, and 70 parts of decane, 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-4). As to the solvent (S-4), the weight of the insoluble content of the resin (b) relative to the weight of the resin (b) in an equivalent weight mixture of the resin (b) and the solvent (S-4) in a standard condition was 0.1% by weight or less, and the SP value of the solvent (S-4) was 10.3.

Production Example 8

Preparation of Resin Precursor (b0-1)

In an autoclave, 407 parts of the resin (b-1) obtained in Production Example 1, 54 parts of isophorone diisocyanate (IPDI), and 485 parts of acetone were charged, and allowed to react for 5 hours at 100° C. in a hermetically-sealed condition, to obtain a resin precursor (b0-1) having an isocyanate group at its molecular end. The NCO content of the resin precursor (b0-1) was 0.8%.

Production Example 9

Preparation of Curing Agent (β)

In a reaction vessel equipped with a stirrer, a solvent removing device and a thermometer, 50 parts of isophorone diamine and 300 parts of methyl ethyl ketone were charged, and allowed to react at 50° C. for 5 hours, and then the solvent was removed to obtain a curing agent (β) which is a ketimine compound (a chain extender of a urethane prepolymer). The total amine value of the curing agent (β) was 415.

Production Example 10

Preparation of Resin Precursor Solution (L-5)

In a vessel equipped with a stirrer, 700 parts of a solvent (S-5) which is dimethylformamide, 228 parts of the resin (b-1) obtained in Production Example 1, 57 parts of the resin precursor (b0-1) obtained in Production Example 8, 1.5 parts of the curing agent (β) and 15 parts of carbon black were charged, and stirred until the resin precursor (b0-1) and the curing agent (β) were completely dissolved, to obtain a resin solution (L-5). As to the solvent (S-5), the weight of the insoluble content of the resin (b) and the precursor (b0) relative to the weight of the resin (b) and the precursor (b0) in an equivalent weight mixture of the resin (b) and the precursor (b0) and the solvent (S-5) of the above weight ratio in a standard condition was 0.1% by weight or less, and the SP value of the solvent (S-5) was 12.0.

Production Example 11

Preparation of Resin Solution (L-6)

In a vessel equipped with a stirrer, 700 parts of a solvent (S-6) which is a mixed solvent consisting of 490 parts of acetone and 210 parts of ion exchange water, 228 parts of the resin (b-1) obtained in Production Example 1, 57 parts of the resin (b-2) obtained in Production Example 2 and 15 parts of carbon black were charged, and stirred until the resins (b-1) and (b-2) were completely dissolved, to obtain a resin solution (L-6). As to the solvent (S-6), the weight of the insoluble content of the resin (b) relative to the weight of the resin (b) in an equivalent weight mixture of the resin (b) and the solvent (S-6) in a standard condition was 15% by weight, and the SP value of the solvent (S-6) was 14.0.

Production Example 12

Preparation of Resin Solution (L-7)

In a vessel equipped with a stirrer, 700 parts of a solvent (S-7) which is a mixed solvent consisting of 665 parts of methyl ethyl ketone and 35 parts of ion exchange water, 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-7). As to the solvent (S-7), the weight of the insoluble content of the resin (b) relative to the weight of the resin (b) in an equivalent weight mixture of the resin (b) and the solvent (S-7) in a standard condition was 0.1% by weight or less, and the SP value of the solvent (S-7) was 9.7.

Production Example 13

Preparation of Resin Solution (L-8)

In a vessel equipped with a stirrer, 700 parts of 1,3-dioxolane (S-8), 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-8). As to the solvent (S-8), the weight of the insoluble content of the resin (b) relative to the weight of the resin (b) in an equivalent weight mixture of the resin (b) and the solvent (S-8) in a standard condition was 0.5% by weight, and the SP value of the solvent (S-8) was 9.4.

Production Example 14

Preparation of Resin Solution (L-9)

In a vessel equipped with a stirrer, 700 parts of methyl pyruvate (S-9), 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-9). As to the solvent (S-9), the weight of the insoluble content of the resin (b) relative to the weight of the resin (b) in an equivalent weight mixture of the resin (b) and the solvent (S-9) in a standard condition was 1% by weight, and the SP value of the solvent (S-9) was 10.6.

Production Example 15

Preparation of Resin Solution (L-10)

In a vessel equipped with a stirrer, 700 parts of propylene glycol monomethyl ether (S-10), 228 parts of the resin (b-1) obtained in Production Example 1, 57 parts of the resin (b-2)

obtained in Production Example 2, and 15 parts of carbon black were charged, and stirred until the resins (b-1) and (b-2) were completely dissolved, to obtain a resin solution (L-10). As to the solvent (S-10), the weight of the insoluble content of the resin (b) relative to the weight of the resin (b) in an equivalent weight mixture of the resin (b) and the solvent (S-10) in a standard condition was 3% by weight, and the SP value of the solvent (S-10) was 11.3.

Production Example 16

Preparation of Resin Solution (L-11)

In a vessel equipped with a stirrer, 700 parts of methyl 2-hydroxyisobutyrate (S-11), 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-11). As to the solvent (S-11), the weight of the insoluble content of the resin (b) relative to the weight of the resin (b) in an equivalent weight mixture of the resin (b) and the solvent (S-11) in a standard condition was 7% by weight, and the SP value of the solvent (S-11) was 11.8.

Production Example 17

Preparation of Resin Solution (L-12)

In a vessel equipped with a stirrer, 700 parts of methyl lactate (S-12), 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-12). As to the solvent (S-12), the weight of the insoluble content of the resin (b) relative to the weight of the resin (b) in an equivalent weight mixture of the resin (b) and the solvent (S-12) in a standard condition was 10% by weight, and the SP value of the solvent (S-12) was 12.4.

Production Example 18

Preparation of Resin Solution (L-13)

In a vessel equipped with a stirrer, 700 parts of trifluoroethanol (S-13), 228 parts of the resin (b-1) obtained in Production Example 1, 57 parts of the resin (b-2) obtained in Production Example 2, and 15 parts of carbon black were charged, and stirred until the resins (b-1) and (b-2) were completely dissolved, to obtain a resin solution (L-13). As to the solvent (S-13), the weight of the insoluble content of the resin (b) relative to the weight of the resin (b) in an equivalent weight mixture of the resin (b) and the solvent (S-13) in a standard condition was 18% by weight, and the SP value of the solvent (S-13) was 15.1.

Production Example 19

Preparation of Crystalline Resin (a1-1)

In a reaction vessel equipped with a cooling tube, a stirrer and a nitrogen introducing tube, 230 parts of dodecanedioic acid, 195 parts of 1,6-hexanediol, and 0.5 parts of tetrabutoxytitanate as a condensation catalyst were charged, and allowed to react for 4 hours while the temperature was gradually elevated to 230° C. under a nitrogen gas flow while generated water was distilled off. The reaction was further allowed under a reduced pressure of 5 to 20 mmHg, and then the product was taken out. After cooling the resin taken out to room temperature, the resin was ground into particles, to obtain a crystalline polyester resin (a1-1). This resin had a crystallinity of 60%, a melting point of 60° C., and an Mn of 8,000.

Production Example 20

Preparation of Crystalline Resin (a1-2)

In a reaction vessel equipped with a stirrer, a heating and cooling device, a thermometer, a dropping funnel, and a nitrogen blowing tube, 500 parts of toluene was charged, and in another glass beaker, 350 parts of toluene, 150 parts of behenyl acrylate (an acrylate of an alcohol having a straight-chain alkyl group with 22 carbon atoms, BLEMMER VA [manufactured by NOF CORPORATION]), and 7.5 parts of AIBN (azobisisobutyronitrile) were charged, stirred at 20° C., and mixed to prepare a monomer solution, which was then charged into a dropping funnel. After replacing a gas phase part of the reaction vessel with nitrogen, the monomer solution was added dropwise over 2 hours at 80° C. in a hermetically-sealed condition, and aged at 85° C. for 2 hours from the end of the dropping, and then toluene was removed over 3 hours at 130° C. under a reduced pressure, to obtain a crystalline vinyl resin (a1-2). This resin had a crystallinity of 42%, a melting point of 65° C., and an Mn of 50,000.

Production Example 21

Preparation of Crystalline Resin (a1-3)

In a reaction vessel equipped with a stirrer, a heating and cooling device, a thermometer, a dropping funnel, and a nitrogen blowing tube, 500 parts of toluene was charged, and in another glass beaker, 350 parts of toluene, 120 parts of behenyl acrylate, 30 parts of 2-decyltetradecyl methacrylate, and 7.5 parts of AIBN (azobisisobutyronitrile) were charged, stirred at 20° C., and mixed to prepare a monomer solution, which was then charged into a dropping funnel. After replacing a gas phase part of the reaction vessel with nitrogen, the monomer solution was added dropwise over 2 hours at 80° C. in a hermetically-sealed condition, and aged at 85° C. for 2 hours from the end of the dropping, and then toluene was removed over 3 hours at 130° C. under a reduced pressure, to obtain a crystalline vinyl resin (a1-3). This resin had a crystallinity of 36%, a melting point of 62° C., and an Mn of 50,000.

Production Example 22

Preparation of Crystalline Resin (a1-4)

In a reaction vessel equipped with a stirrer, a heating and cooling device, a thermometer, a dropping funnel, and a nitrogen blowing tube, 500 parts of toluene was charged, and in another glass beaker, 350 parts of toluene, 150 parts of behenyl acrylate, 50 parts of butyl acrylate, and 7.5 parts of AIBN (azobisisobutyronitrile) were charged, stirred at 20° C., and mixed to prepare a monomer solution, which was then charged into a dropping funnel. After replacing a gas phase part of the reaction vessel with nitrogen, the monomer solution was added dropwise over 2 hours at 80° C. in a hermetically-sealed condition, and aged at 85° C. for 2 hours from the end of the dropping, and then toluene was removed over 3 hours at 130° C. under a reduced pressure, to obtain a crystalline vinyl resin (a1-4). This resin had a crystallinity of 20%, a melting point of 50° C., and an Mn of 40,000.

Production Example 23

Preparation of Crystalline Resin (a1-5)

In a reaction vessel equipped with a cooling tube, a stirrer and a nitrogen introducing tube, 460 parts of dodecanedioic acid, 230 parts of 1,6-hexanediol, and 0.5 parts of tetrabutoxytitanate as a condensation catalyst were charged, and allowed to react for 4 hours while the temperature was gradually elevated to 230° C. under a nitrogen gas flow while generated water was distilled off. The reaction was further allowed under a reduced pressure of 5 to 20 mmHg, and then the product was taken out. After cooling the resin taken out to room temperature, the resin was ground into particles, to obtain a crystalline polyester resin (a1-5). This resin had a crystallinity of 65%, a melting point of 70° C., and an Mn of 10,000.

Production Example 24

Preparation of Crystalline Resin (a1-6)

In a reaction vessel equipped with a cooling tube, a stirrer and a nitrogen introducing tube, 460 parts of dodecanedioic acid, 230 parts of 1,6-hexanediol, and 0.5 parts of tetrabutoxytitanate as a condensation catalyst were charged, and allowed to react for 4 hours while the temperature was gradually elevated to 230° C. under a nitrogen gas flow while generated water was distilled off. The reaction was further allowed under a reduced pressure of 5 to 20 mmHg. After cooling the obtained resin to 50° C., it was dissolved in 300 parts of methyl ethyl ketone, added with 20 parts of hexamethylene diisocyanate, allowed to react for 3 hours, and taken out after removing the solvent at a reduced pressure of 20 mmHg. The resin taken out was ground into particles, to obtain a crystalline polyurethane resin (a1-6). This resin had a crystallinity of 50%, a melting point of 70° C., and an Mn of 15,000.

Production Example 25

Preparation of Crystalline Resin (a1-7)

In a reaction vessel equipped with a stirrer, a heating and cooling device, a thermometer, a dropping funnel, and a nitrogen blowing tube, 500 parts of toluene was charged, and in another glass beaker, 350 parts of toluene, 135 parts of behenyl acrylate, 15 parts of acrylonitrile, and 7.5 parts of AIBN (azobisisobutyronitrile) were charged, stirred at 20° C., and mixed to prepare a monomer solution, which was then charged into a dropping funnel. After replacing a gas phase part of the reaction vessel with nitrogen, the monomer solution was added dropwise over 2 hours at 80° C. in a hermetically-sealed condition, and aged at 85° C. for 2 hours from the end of the dropping, and then toluene was removed over 3 hours at 130° C. under a reduced pressure, to obtain a crystalline vinyl resin (a1-7). This resin had a crystallinity of 41%, a melting point of 62° C., and an Mn of 50,000.

Production Example 26

Preparation of Crystalline Resin (a1-8)

In a reaction vessel equipped with a cooling tube, a stirrer and a nitrogen introducing tube, 90 parts of terephthalic acid, 340 parts of sebacic acid, 310 parts of 1,6-hexanediol, and 0.5 parts of tetrabutoxytitanate as a condensation catalyst were charged, and allowed to react for 4 hours while the temperature was gradually elevated to 230° C. under a nitrogen gas flow while generated water was distilled off. The reaction was further allowed under a reduced pressure of 5 to 20 mmHg, and then the resin was taken out. The resin taken out was cooled to room temperature, and ground into particles, to obtain a crystalline polyester resin (a1-8). This resin had a crystallinity of 60%, a melting point of 67° C., and an Mn of 9,000.

Production Example 27

Preparation of Crystalline Resin (a1-9)

In a reaction vessel equipped with a stirrer, a heating and cooling device, a thermometer, a dropping funnel, and a nitrogen blowing tube, 500 parts of toluene was charged, and in another glass beaker, 350 parts of toluene, 150 parts of stearyl acrylate (an acrylate of an alcohol having a straight-chain alkyl group with 18 carbon atoms, BLEMMER SA [manufactured by NOF CORPORATION]), and 7.5 parts of AIBN (azobisisobutyronitrile) were charged, stirred at 20° C., and mixed to prepare a monomer solution, which was then charged into a dropping funnel. After replacing a gas phase part of the reaction vessel with nitrogen, the monomer solution was added dropwise over 2 hours at 80° C. in a hermetically-sealed condition, and aged at 85° C. for 2 hours from the end of the dropping, and then toluene was removed over 3 hours at 130° C. under a reduced pressure, to obtain a crystalline vinyl resin (a1-9). This resin had a crystallinity of 32%, a melting point of 54° C., and an Mn of 50,000.

Production Example 28

Preparation of Microparticle (A-1) Dispersion Liquid to Microparticle (A-9) Dispersion Liquid After mixing 700 parts of n-hexane, and each 300 parts of the crystalline resins (a1-1) to (a1-9), grinding was conducted using zirconia beads having a particle size of 0.3 mm by means of a beads mill (DYNO-MILL MULTI-LAB: manufactured by Shinmaru Enterprises Corporation) to obtain milky white microparticle (A-1) dispersion liquid to microparticle (A-9) dispersion liquid. The volume average particle sizes of the dispersion liquids were 0.2 to 0.4 μm as shown in Table 1 and Table 2. The degrees of swelling of the microparticles (A-1) to (A-9) are as shown in Table 1 and Table 2.

Production Example 29

Preparation of Microparticle (A-10) Dispersion Liquid

A milky white microparticle (A-10) dispersion liquid was obtained in a similar manner to Production Example 28 except that a polyolefin resin (SANWAX 161-P (manufactured by Sanyo Chemical Industries, Ltd.), having a crystallinity of 75%, a melting point of 107° C., and an Mn of 5,000) (a1-10) was used in place of each of the crystalline resins (a1-1) to (a1-9) in Production Example 28. The volume average particle size of this dispersion liquid was 0.4 μm. Also, the degree of swelling of the microparticle (A-10) was 15%.

Production Example 30

Preparation of Microparticle (A-11)

In a reaction container equipped with a stirring rod and a thermometer, 683 parts of water, 11 parts of a sodium salt of methacrylic acid ethylene oxide adduct sulfate (Eleminol RS-30, manufactured by Sanyo Chemical Industries, Ltd.), 139 parts of styrene, 20 parts of divinylbenzene, 138 parts of methacrylic acid, 184 parts of butyl acrylate, and 1 part of ammonium persulfate were charged, and stirred for 15 minutes at 400 rpm, to obtain a white emulsion. The emulsion was heated to elevate the internal temperature of the system to 75° C. and the reaction was allowed for 5 hours. Further, 30 parts of a 1% aqueous ammonium persulfate solution was added, and aged at 75° C. for 5 hours, to obtain an aqueous dispersion liquid of a microparticle (A-11) of a noncrystalline vinyl resin (a2-1) (a copolymer of styrene-methacrylic acid-butyl acrylate-sodium salt of methacrylic acid EO adduct sulfate-divinylbenzene, crosslinked). The volume average particle size of the aqueous dispersion liquid measured by LA-920 was 0.15 μm. Further, the aqueous dispersion liquid was lyophilized, to obtain the microparticle (A-11). The noncrystalline vinyl resin (a2-1) had a crystallinity of 0%, and a glass transition temperature of 69° C. The degree of swelling of the microparticle (A-11) was 1%.

Production Example 31

Preparation of Microparticle (A-12) Dispersion Liquid

In a reaction vessel equipped with a stirring rod and a thermometer, 683 parts of water, 11 parts of a sodium salt of methacrylic acid ethylene oxide adduct sulfate (Eleminol RS-30, manufactured by Sanyo Chemical Industries, Ltd.), 139 parts of styrene, 138 parts of methyl methacrylate, 184 parts of butyl acrylate, and 1 part of ammonium persulfate were charged, and stirred for 15 minutes at 400 rpm, to obtain a white emulsion. The emulsion was heated to elevate the internal temperature of the system to 75° C. and the reaction was allowed for 5 hours. Further, 30 parts of a 1% aqueous ammonium persulfate solution was added, and aged at 75° C. for 5 hours, to obtain an aqueous dispersion liquid of a microparticle (A-12) of a noncrystalline vinyl resin (a2-2) (a copolymer of styrene-methylmethacrylate-butyl acrylate-sodium salt of methacrylic acid EO adduct sulfate). The volume average particle size of the aqueous dispersion liquid measured by LA-920 was 0.15 μm. Further, the aqueous dispersion liquid was lyophilized, to obtain the microparticle (A-12). The noncrystalline vinyl resin (a2-2) had a crystallinity of 0%, and a glass transition temperature of 56° C. Further, the microparticle (A-12) had a degree of swelling of 10%.

Production Example 32

Preparation of Dispersion Stabilizer (E) Solution

In a reaction vessel equipped with a stirrer, 700 parts of THF was charged, and after replacing the air in the reaction vessel with nitrogen, the system was heated to the reflux temperature. Then a mixture of 150 parts of methyl methacrylate, 150 parts of methacryl-modified silicone (functional group equivalent: 12,000 g/mol, Mn 12,000, manufactured by Shin-Etsu Chemical Co., Ltd.: X22-2426), and 1.5 parts of azobisisobutyronitrile was added dropwise to the reaction vessel over 2 hours, and aged for 6 hours at the reflux temperature, to obtain a dispersion stabilizer (E-1) solution. The weight average molecular weight of (E-1) was 20,000.

Example 1

In an experiment device of FIG. 1, first, valves V1, V2 were closed, and carbon dioxide (purity 99.99%) was introduced into a particle collecting vessel T4 from a cylinder B2 and a pump P4 to adjust the pressure and the temperature to 14 MPa and 40° C. Further, a resin solution tank T1 was charged with the resin solution (L-1), and a microparticle dispersion liquid tank T2 was charged with the microparticle (A-1) dispersion liquid. Next, by means of a cylinder B1 and a pump P3, carbon dioxide was introduced into a dispersion vessel T3 to adjust a pressure and a temperature of 9 MPa and 40° C., and further the microparticle (A-1) dispersion liquid was introduced from the tank T2 and a pump P2. Next, the resin solution (L-1) was introduced into the dispersion vessel T3 from the tank T1 and the pump P1 while inside the dispersion vessel T3 was stirred at 2000 rpm. The internal pressure of T3 after introduction was 14 MPa.

The weight ratio of the composition charged into the dispersion vessel T3 is as follows.

| | |
|---|---|
| Resin solution (L-1) | 270 parts |
| Microparticle (A-1) dispersion liquid | 45 parts |
| Carbon dioxide | 550 parts |

The weight of the introduced carbon dioxide was determined by calculating the density of carbon dioxide by the condition formula described in the following document 2 from the temperature (40° C.) and the pressure (15 MPa) of carbon dioxide, and multiplying this by the volume of the dispersion vessel T3.

Document 2: Journal of Physical and Chemical Reference data, vol. 25, P. 1509 to 1596 (1996).

After introducing the resin solution (L-1), stirring was conducted for 1 minute, to obtain a dispersion (X1). After introducing carbon dioxide into T4 from P3 by opening the valve V1, the dispersion (X1) was introduced into T4 and the opening degree of V2 was adjusted so that the pressure was kept constant during this operation. This operation was conducted for 30 seconds, and V1 was closed. By this operation, extraction of the solvent from the resin solution introduced into T4 was conducted. Further, T4 was heated to 60° C., and kept for 15 minutes. By this operation, the microparticle (A-1) was fixed to a surface of the resin particle (B-1) formed from the resin solution (L-1), and the resin particle (C-1) was generated. Next, by keeping the pressure at 14 MPa by the pressure adjustment valve V2 while introducing carbon dioxide into the particle collecting vessel T4 from the pressure cylinder B2 and the pump P4, carbon dioxide containing the extracted solvent was discharged to a solvent trap tank T5 and the resin particle (C-1) was captured by a filter F1. In the operation of introducing carbon dioxide into the particle collecting vessel T4 from the pressure cylinder B2 and the pump P4, introduction of carbon dioxide was stopped when an amount 5 times the weight of carbon dioxide introduced into the above dispersion vessel T3 was introduced into the particle collecting vessel T4. At the time of this stopping, the operation of replacing carbon dioxide containing a solvent with carbon dioxide not containing a solvent and capturing the resin particle (C-1) in the filter F1 was completed. Further, the pressure adjustment valve V2 was opened little by little, and the internal pressure of the particle collecting tank was reduced to atmospheric pressure, and the resin particle (C-1) in which a film derived from the microparticle (A) is formed on a surface of the resin particle (B) captured by the filter F1 was obtained.

Example 2

A resin particle (C-2) in which a film derived from the microparticle (A) is formed on a surface of the resin particle (B) was obtained in a similar manner to Example 1 except that a microparticle (A-2) dispersion liquid was used in place of the microparticle (A-1) dispersion liquid and the resin solution (L-2) was used in place of the resin solution (L-1) in Example 1. The weight ratio of the composition charged into the dispersion vessel T3 in Example 2 is as follows.

| Resin solution (L-2) | 270 parts |
| Microparticle (A-2) dispersion liquid | 45 parts |
| Carbon dioxide | 550 parts |

Example 3

A resin particle (C-3) in which a film derived from the microparticle (A) is formed on a surface of the resin particle (B) was obtained in a similar manner to Example 1 except that a microparticle (A-3) dispersion liquid was used in place of the microparticle (A-1) dispersion liquid and the resin solution (L-3) was used in place of the resin solution (L-1) in Example 1. The weight ratio of the composition charged into the dispersion vessel T3 in Example 3 is as follows.

| Resin solution (L-3) | 270 parts |
| Microparticle (A-3) dispersion liquid | 45 parts |
| Carbon dioxide | 550 parts |

Example 4

A resin particle (C-4) in which a film derived from the microparticle (A) is formed on a surface of the resin particle (B) was obtained in a similar manner to Example 1 except that a microparticle (A-4) dispersion liquid was used in place of the microparticle (A-1) dispersion liquid and the resin solution (L-4) was used in place of the resin solution (L-1) in Example 1. The weight ratio of the composition charged into the dispersion vessel T3 in Example 4 is as follows.

| Resin solution (L-4) | 270 parts |
| Microparticle (A-4) dispersion liquid | 45 parts |
| Carbon dioxide | 550 parts |

Example 5

A resin particle (C-5) in which a film derived from the microparticle (A) is formed on a surface of the resin particle (B) was obtained in a similar manner to Example 1 except that a microparticle (A-5) dispersion liquid was used in place of the microparticle (A-1) dispersion liquid, 14 parts of a hydrophobic dispersion stabilizer (E-1) was added, and the resin solution (L-5) was used in place of the resin solution (L-1) in Example 1. The weight ratio of the composition charged into the dispersion vessel T3 in Example 5 is as follows.

| Resin solution (L-5) | 270 parts |
| Microparticle (A-5) dispersion liquid | 45 parts |
| Dispersion stabilizer (E-1) solution | 14 parts |
| Carbon dioxide | 550 parts |

Example 6

A resin particle (C-6) in which a film derived from the microparticle (A) is formed on a surface of the resin particle (B) was obtained in a similar manner to Example 1 except that a microparticle (A-6) dispersion liquid was used in place of the microparticle (A-1) dispersion liquid and the resin solution (L-6) was used in place of the resin solution (L-1) in Example 1. The weight ratio of the composition charged into the dispersion vessel T3 in Example 6 is as follows.

| Resin solution (L-6) | 270 parts |
| Microparticle (A-6) dispersion liquid | 45 parts |
| Carbon dioxide | 550 parts |

Example 7

A resin particle (C-7) in which a film derived from the microparticle (A) is formed on a surface of the resin particle (B) was obtained in a similar manner to Example 1 except that a microparticle (A-7) dispersion liquid was used in place of the microparticle (A-1) dispersion liquid in Example 1. The weight ratio of the composition charged into the dispersion vessel T3 in Example 7 is as follows.

| Resin solution (L-1) | 270 parts |
| Microparticle (A-7) dispersion liquid | 45 parts |
| Carbon dioxide | 550 parts |

Example 8

A resin particle (C-8) in which a film derived from the microparticle (A) is formed on a surface of the resin particle (B) was obtained in a similar manner to Example 1 except that a microparticle (A-8) dispersion liquid was used in place of the microparticle (A-1) dispersion liquid in Example 1. The weight ratio of the composition charged into the dispersion vessel T3 in Example 8 is as follows.

| Resin solution (L-1) | 270 parts |
| Microparticle (A-8) dispersion liquid | 45 parts |
| Carbon dioxide | 550 parts |

Example 9

A resin particle (C-9) in which the microparticle (A) is fixed to a surface of the resin particle (B) was obtained in a similar manner to Example 1 except that a microparticle (A-13) formed of hydrophobic silica (RX-50, manufactured by Nippon Aerosil Co., Ltd., volume average particle size 150 nm) (a3-1) having a degree of swelling of 0% was used in place of the microparticle (A-1) dispersion liquid, and the resin precursor (b0-1) and 20 parts of ion exchange water were used in place of the resin solution (L-1) in Example 1.

The weight ratio of the composition charged into the dispersion vessel T3 in Example 9 is as follows.

| | |
|---|---|
| Resin precursor (b0-1) | 270 parts |
| Ion exchange water (water for ketimine elongation) | 20 parts |
| Hydrophobic silica (A-9) | 7 parts |
| Carbon dioxide | 550 parts |

Example 10

A resin particle (C-10) in which the microparticle (A) is fixed to a surface of the resin particle (B) was obtained in a similar manner to Example 1 except that the microparticle (A-11) was preliminarily charged into T3 in place of the microparticle (A-1) dispersion liquid in Example 1. The weight ratio of the composition charged into the dispersion vessel T3 in Example 10 is as follows.

| | |
|---|---|
| Resin solution (L-1) | 270 parts |
| Microparticle (A-10) | 13.5 parts |
| Carbon dioxide | 550 parts |

Example 11

A resin particle (C-11) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-7) was used in place of the resin solution (L-1) in Example 1. The weight ratio of the composition charged into the dispersion vessel T3 in Example 11 is as follows.

| | |
|---|---|
| Resin solution (L-7) | 270 parts |
| Microparticle (A-2) dispersion liquid | 45 parts |
| Carbon dioxide | 550 parts |

Example 12

A resin particle (C-12) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-8) was used in place of the resin solution (L-1) in Example 1. The weight ratio of the composition charged into the dispersion vessel T3 in Example 12 is as follows.

| | |
|---|---|
| Resin solution (L-8) | 270 parts |
| Microparticle (A-2) dispersion liquid | 45 parts |
| Carbon dioxide | 550 parts |

Example 13

A resin particle (C-13) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-9) was used in place of the resin solution (L-1) in Example 1. The weight ratio of the composition charged into the dispersion vessel T3 in Example 13 is as follows.

| | |
|---|---|
| Resin solution (L-9) | 270 parts |
| Microparticle (A-2) dispersion liquid | 45 parts |
| Carbon dioxide | 550 parts |

Example 14

A resin particle (C-14) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-10) was used in place of the resin solution (L-1) in Example 1. The weight ratio of the composition charged into the dispersion vessel T3 in Example 14 is as follows.

| | |
|---|---|
| Resin solution (L-10) | 270 parts |
| Microparticle (A-2) dispersion liquid | 45 parts |
| Carbon dioxide | 550 parts |

Example 15

A resin particle (C-15) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-11) was used in place of the resin solution (L-1) in Example 1. The weight ratio of the composition charged into the dispersion vessel T3 in Example 15 is as follows.

| | |
|---|---|
| Resin solution (L-11) | 270 parts |
| Microparticle (A-2) dispersion liquid | 45 parts |
| Carbon dioxide | 550 parts |

Example 16

A resin particle (C-16) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-12) was used in place of the resin solution (L-1) in Example 1. The weight ratio of the composition charged into the dispersion vessel T3 in Example 16 is as follows.

| | |
|---|---|
| Resin solution (L-12) | 270 parts |
| Microparticle (A-2) dispersion liquid | 45 parts |
| Carbon dioxide | 550 parts |

Example 17

A resin particle (C-17) in which a film derived from the microparticle (A) is formed on a surface of the resin particle (B) was obtained in a similar manner to Example 1 except that the microparticle (A-2) dispersion liquid was used in place of the microparticle (A-1) dispersion liquid and the resin solution (L-13) was used in place of the resin solution (L-1) in Example 1. The weight ratio of the composition charged into the dispersion vessel T3 in Example 17 is as follows.

| Resin solution (L-13) | 270 parts |
|---|---|
| Microparticle (A-2) dispersion liquid | 45 parts |
| Carbon dioxide | 550 parts |

Example 18

A resin particle (C-18) in which a film derived from the microparticle (A) is formed on a surface of the resin particle (B) was obtained in a similar manner to Example 1 except that the microparticle (A-9) dispersion liquid was used in place of the microparticle (A-1) dispersion liquid and the resin solution (L-2) was used in place of the resin solution (L-1) in Example 1. The weight ratio of the composition charged into the dispersion vessel T3 in Example 18 is as follows.

| Resin solution (L-2) | 270 parts |
|---|---|
| Microparticle (A-9) dispersion liquid | 45 parts |
| Carbon dioxide | 550 parts |

Example 19

A resin particle (C-19) in which a film derived from the microparticle (A) is formed on a surface of the resin particle (B) was obtained in a similar manner to Example 1 except that the microparticle (A-10) dispersion liquid was used in place of the microparticle (A-1) dispersion liquid in Example 1. The weight ratio of the composition charged into the dispersion vessel T3 in Example 19 is as follows.

| Resin solution (L-1) | 270 parts |
|---|---|
| Microparticle (A-10) dispersion liquid | 45 parts |
| Carbon dioxide | 550 parts |

Example 20

In a beaker, 11 parts of an aqueous dispersion liquid (solid concentration: 20% by weight) of the microparticle (A-12), 80 parts of a 48.5% aqueous solution of sodium dodecyl diphenylether disulfonate, and 300 parts of ion exchange water were mixed and stirred, 150 parts of the resin solution (L-1) was mixed, and then the contents were mixed for 10 minutes at a rotation speed of 12,000 rpm by using TK homomixer (manufactured by Tokushu Kika). After mixing, the mixture was put in a reaction vessel equipped with a stirring rod and a thermometer, and the solvent was removed at 50° C. over 2 hours, followed by filtration and drying, to obtain a resin particle (C-20). The weight ratio of the composition charged into the beaker in Example 20 is as follows.

| Resin solution (L-1) | 150 parts |
|---|---|
| Aqueous dispersion liquid of microparticle (A-12) | 11 parts |
| 48.5% aqueous solution of sodium dodecyl diphenylether disulfate | 80 parts |
| Ion exchange water | 300 parts |

Comparative Example 1

A comparative resin particle (C-1') was obtained in a similar manner to Example 1 except that the microparticle (A-1) dispersion liquid was not charged in Example 1. The weight ratio of the composition charged into the dispersion vessel T3 in Comparative Example 1 is as follows.

| Resin solution (L-1) | 270 parts |
|---|---|
| Carbon dioxide | 550 parts |

Comparative Production Example 1

In a reaction vessel equipped with a stirring rod and a thermometer, 683 parts of water, 11 parts of a sodium salt of methacrylic acid ethylene oxide adduct sulfate (Eleminol RS-30, manufactured by Sanyo Chemical Industries, Ltd.), 100 parts of styrene, 138 parts of methyl methacrylate, 184 parts of butyl acrylate, and 1 part of ammonium persulfate were charged, and stirred for 15 minutes at 400 rpm, to obtain a white emulsion. The emulsion was heated to elevate the internal temperature of the system to 75° C. and the reaction was allowed for 5 hours. Further, 30 parts of a 1% aqueous ammonium persulfate solution was added, and aged at 75° C. for 5 hours, to obtain an aqueous dispersion liquid of a vinyl resin (a-1') (a copolymer of a styrene-methyl methacrylate-butyl acrylate-sodium salt of methacrylic acid EO adduct sulfate). The volume average particle size of the aqueous dispersion liquid measured by LA-920 was 0.15 μm. Further, the aqueous dispersion liquid was lyophilized, to obtain a comparative resin microparticle (A-1'). The degree of swelling of (A-1') was 18%.

Comparative Example 2

A comparative resin particle (C-2') was obtained in a similar manner to Example 1 except that T3 was preliminarily charged with the comparative resin microparticle (A-1') in place of the microparticle (A-1) dispersion liquid in Example 1. The weight ratio of the composition charged into the dispersion vessel T3 in Comparative Example 2 is as follows.

| Resin solution (L-1) | 270 parts |
|---|---|
| Comparative resin microparticle (A-1') | 15 parts |
| Carbon dioxide | 550 parts |

Comparative Production Example 2

In a reaction vessel equipped with a stirring rod and a thermometer, 683 parts of water, 11 parts of a sodium salt of methacrylic acid ethylene oxide adduct sulfate (Eleminol RS-30, manufactured by Sanyo Chemical Industries, Ltd.), 111 parts of styrene, 128 parts of methyl methacrylate, 164 parts of butyl acrylate, 58 parts of 2-ethylhexylmethacrylate, and 1 part of ammonium persulfate were charged, and stirred for 15 minutes at 400 rpm, to obtain a white emulsion. The emulsion was heated to elevate the internal temperature of the system to 75° C. and the reaction was allowed for 5 hours. Further, 30 parts of a 1% aqueous ammonium persulfate solution was added, and aged at 75° C. for 5 hours, to obtain an aqueous dispersion liquid of a comparative resin particle (A-2') of a vinyl resin (a-2') (a copolymer of styrene-methyl methacrylate-butyl acrylate-2-ethylhexylmethacrylate-sodium salt of methacrylic acid EO adduct sulfate). The volume average particle size of the aqueous dispersion liquid measured by LA-920 was 0.15 μm. The degree of swelling of (A-2') was 21%.

Comparative Example 3

In a beaker, 11 parts of an aqueous dispersion liquid of the comparative resin particle (A-2'), 80 parts of a 48.5% aqueous solution of sodium dodecyl diphenylether disulfonate, and 300 parts of ion exchange water were mixed and stirred, 150 parts of the resin solution (L-1) was mixed, and then the contents were mixed for 10 minutes at a rotation speed of 12,000 rpm by using TK homomixer (manufactured by Tokushu Kika). After mixing, the mixture was put in a reaction vessel equipped with a stirring rod and a thermometer, and the solvent was removed at 50° C. over 2 hours, followed by filtration and drying, to obtain a resin particle (C-3'). The weight ratio of the composition charged into the beaker in Comparative Example 3 is as follows.

| | |
|---|---|
| Resin solution (L-1) | 150 parts |
| Aqueous dispersion liquid of comparative resin particle (A-2') | 11 parts |
| 48.5% aqueous solution of sodium dodecyl diphenylether disulfate | 80 parts |
| Ion exchange water | 300 parts |

Comparative Example 4

A resin particle (C-4') was obtained in a similar manner to Example 1 except that 228 parts of the resin (b-1) and 57 parts of (b-2) were used in place of the resin solution (L-1), the microparticle (A-2) dispersion liquid was used in place of the microparticle (A-1) dispersion liquid, and in introducing the resin (b-1) into the dispersion vessel T3 from the tank T1 and the pump P1, the temperature was elevated to 100° C. to melt the resin in Example 1. The weight ratio of the composition charged into the dispersion vessel T3 in Comparative Example 4 is as follows.

| | |
|---|---|
| Resin (b-1) | 228 parts |
| Resin (b-2) | 57 parts |
| Microparticle (A-2) dispersion liquid | 45 parts |
| Carbon dioxide | 550 parts |

Materials and physical property values of the resin particles of the present invention and the comparative resin particles are shown in Tables 1 to 3.
Evaluation Results For the resin particles obtained in Examples 1 to 20, and Comparative Examples 1 to 4, surface wettability, particle size distribution, heat resistant keeping property, humidity and heat resistant keeping property, and low temperature fixing temperature were evaluated by the following evaluation methods, and the results are shown in Tables 4 to 6.
<Evaluation of Surface Wettability>

In a 100 mL beaker, 0.1 g of resin particles were added, and further 20 mL of ion exchange water was added, and the contents were stirred with a magnetic stirrer so that the resin particles float on the liquid surface. Then acetone was added dropwise little by little, and the acetone weight (Wa) and the water weight (Ww) when the resin particles floating on the surface disappear were determined to three significant figures, and the solubility parameter (δm) of the resin particle surface was calculated from the formula (I).

$$\delta m = (9.75 \times Wa + 23.43 \times Ww)/(Wa + Ww) \quad (1)$$

<Evaluation of Particle Size Distribution>

Resin particles were dispersed in an aqueous sodium dodecylbenzene sulfonate solution (concentration 0.1%) and the volume average particle size/number average particle size of the resin particles (represented by C in the tables) was measured by a Coulter counter [Multisizer III (manufactured by Beckman Coulter, Inc.)]. The smaller the volume average particle size/number average particle size, the sharper the particle size distribution is meant.
<Evaluation of Heat Resistant Keeping Property>

The heat resistant keeping property of the resin particles was evaluated in the following manner. The resin particles were kept still for 15 hours in a dryer whose temperature is controlled to 50° C., and evaluation was made according to the following criteria from the degree of blocking.

good: blocking did not occur acceptable: blocking occurred, but easily dispersed by simply applying force with a finger or the like poor: blocking occurred, and did not easily disperse by simply applying force with a finger or the like
<Evaluation of Humidity and Heat Resistant Keeping Property>

The humidity and heat resistant keeping property of the resin particles was evaluated by the following method. The resin particles were kept still for 15 hours in a thermo-hygrostat set at a temperature of 50° C. and a humidity of 80%, and evaluation was made according to the following criteria from the degree of blocking.

good: blocking did not occur acceptable: blocking occurred, but easily dispersed by simply applying force with a finger or the like poor: blocking occurred, and did not easily disperse by simply applying force with a finger or the like Using the resin particles of the present invention, the toner for electrophotography of the present invention was produced by the following method. The resin particles of the present invention for electrophotographic toner were added with 1.0% of AEROSIL R972 (manufactured by Nippon Aerosil Co., Ltd.), and mixed well by using a mixer to produce toner for electrophotography in which AEROSIL R972 is uniformly adhered to the surface of the resin particles. An evaluation method of the toner is as follows.
<Evaluation of Low Temperature Fixing Temperature>

The low temperature fixing temperature was evaluated by the following method. The toner for electrophotography obtained as described above was placed uniformly on a paper surface so that a density of 0.6 mg/cm$^2$ was achieved. At this time, the method of placing the powder onto the paper surface uses a printer from which a heat fixing machine is removed (other methods may be used as far as the powder can be placed uniformly at the above weight density). The temperature at which cold offset occurred when the resultant paper was caused to pass through a compression roller at a fixing speed (compression roller circumferential speed) of 213 mm/sec and a fixing pressure (compression roller pressure) of 10 kg/cm was measured.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Microparticle (A) | A-1 | A-2 | A-3 | A-4 | A-5 | A-6 | A-7 | A-8 | A-13 | A-11 |
| Constituting material (a) of (A) | a1-1 | a1-2 | a1-3 | a1-4 | a1-5 | a1-6 | a1-7 | a1-8 | a3-1 | a2-1 |
| Composition of (a) | Polyester | Behenyl acrylate homopolymer | Behenyl acrylate copolymer | Behenyl acrylate copolymer | Polyester | Polyurethane | Acrylonitrile copolymer | Polyester | Hydrophobic silica | Crosslinkable vinyl resin |
| Degree of swelling of (A) (%) | 1 | 1 | 3 | 5 | 1 | 1 | 1 | 1 | 0 | 1 |
| Crystallinity of (a) (%) | 60 | 42 | 36 | 20 | 65 | 50 | 41 | 60 | — | — |
| Melting point of (a) [° C.] | 60 | 65 | 62 | 50 | 70 | 70 | 62 | 67 | — | — |
| Number average molecular weight of (a) | 8000 | 50000 | 50000 | 40000 | 10000 | 15000 | 50000 | 9000 | — | — |
| Volume average particle size of (A) [μm] | 0.4 | 0.3 | 0.3 | 0.3 | 0.3 | 0.3 | 0.3 | 0.4 | 0.15 | 0.15 |
| Resin (b) | (b-1) + (b-2) | (b-1) + (b-2) | (b-3) | (b-1) + (b-2) | (b-1) + (b0-1) + β | (b-1) + (b-2) | (b-1) + (b-2) | (b-1) + (b-2) | (b0-1) + water | (b-1) + (b-2) |
| Composition of (b) | Polyester | Polyester | Vinyl resin | Polyester | Polyurethane | Polyester | Polyester | Polyester | Polyurethane | Polyester |
| Weight ratio between (a) and (b) | 15:85 | 15:85 | 15:85 | 15:85 | 15:85 | 15:85 | 15:85 | 15:85 | 7:93 | 15:85 |
| SP value of solvent (S) | 11.8 | 11.3 | 11.3 | 10.3 | 12.0 | 14.0 | 11.8 | 11.8 | — | 11.8 |
| Insoluble content to (S) (% by weight) | 0.1 or less | 0.1 or less | 0.1 or less | 0.1 or less | 0.1 or less | 15 | 0.1 or less | 0.1 or less | — | 0.1 or less |
| Resin solution (L) | L-1 | L-2 | L-3 | L-4 | L-5 | L-6 | L-1 | L-1 | — | L-1 |
| Solvent (S) | S-1 | S-2 | S-3 | S-4 | S-5 | S-6 | S-1 | S-1 | — | S-1 |
| Dispersion stabilizer (E) | — | — | — | — | E-1 | — | — | — | — | — |
| Resin particle (C) | C-1 | C-2 | C-3 | C-4 | C-5 | C-6 | C-7 | C-8 | C-9 | C-10 |

TABLE 2

| | Example | | | | | | | | | |
|---|---|---|---|---|---|---|---|---|---|---|
| | 11 | 12 | 13 | 14 | 15 | 16 | 17 | 18 | 19 | 20 |
| Microparticle (A) | A-2 | A-2 | A-2 | A-2 | A-2 | A-2 | A-2 | A-9 | A-10 | A-12 |
| Constituting material (a) of (A) | a1-2 | a1-2 | a1-2 | a1-2 | a1-2 | a1-2 | a1-2 | a1-9 | a1-10 | a2-2 |
| Composition of (a) | Behenyl acrylate homopolymer | Behenyl acrylate homopolymer | Behenyl acrylate homopolymer | Behenyl acrylate homopolymer | Behenyl acrylate homopolymer | Behenyl acrylate homopolymer | Behenyl acrylate homopolymer | Stearyl acrylate homopolymer | Polyolefin | Vinyl resin |
| Degree of swelling of (A) (%) | 1 | 1 | 1 | 1 | 1 | 1 | 1 | 10 | 15 | 10 |
| Crystallinity of (a) (%) | 42 | 42 | 42 | 42 | 42 | 42 | 42 | 32 | 75 | — |
| Melting point of (a) [° C.] | 65 | 65 | 65 | 65 | 65 | 65 | 65 | 54 | 107 | — |
| Number average molecular weight of (a) | 50000 | 50000 | 50000 | 50000 | 50000 | 50000 | 50000 | 50000 | 5000 | 100000 |
| Volume average particle size of (A) [μm] | 0.3 | 0.3 | 0.3 | 0.3 | 0.3 | 0.3 | 0.3 | 0.2 | 0.4 | 0.15 |
| Resin (b) | (b-1) + (b-2) | (b-1) + (b-2) | (b-1) + (b-2) | (b-1) + (b-2) | (b-1) + (b-2) | (b-1) + (b-2) | (b-1) + (b-2) | (b-1) + (b-2) | (b-1) + (b-2) | (b-1) + (b-2) |
| Composition of (b) | Polyester | Polyester | Polyester | Polyester | Polyester | Polyester | Polyester | Polyester | Polyester | Polyester |
| Weight ratio between (a) and (b) | 15:85 | 15:85 | 15:85 | 15:85 | 15:85 | 15:85 | 15:85 | 15:85 | 15:85 | 5:95 |
| SP value of solvent (S) | 9.7 | 9.4 | 10.6 | 11.3 | 11.8 | 12.4 | 15.1 | 11.3 | 11.8 | 11.8 |
| Insoluble content to (S) (% by weight) | 0.1 or less | 0.5 | 1 | 3 | 7 | 10 | 18 | 0.1 or less | 0.1 or less | 0.1 or less |
| Resin solution (L) | L-7 | L-8 | L-9 | L-10 | L-11 | L-12 | L-13 | L-2 | L-1 | L-1 |
| Solvent (S) | S-7 | S-8 | S-9 | S-10 | S-11 | S-12 | S-13 | S-2 | S-1 | S-1 |

TABLE 2-continued

|  | Example |  |  |  |  |  |  |  |  |  |
|---|---|---|---|---|---|---|---|---|---|---|
|  | 11 | 12 | 13 | 14 | 15 | 16 | 17 | 18 | 19 | 20 |
| Dispersion stabilizer (E) | — | — | — | — | — | — | — | — | — | — |
| Resin particle (C) | C-11 | C-12 | C-13 | C-14 | C-15 | C-16 | C-17 | C-18 | C-19 | C-20 |

|  | Comparative Example |  |  |  |
|---|---|---|---|---|
|  | 1 | 2 | 3 | 4 |
| Microparticle (A) | — | A-1' | A-2' | A-2 |
| Constituting material (a) of (A) | — | a-1' | a-2' | a1-2 |
| Composition of (a) | — | Vinyl resin | Vinyl resin | Behenyl acrylate homopolymer |
| Degree of swelling of (A) (%) | — | 18 | 21 | 1 |
| Volume average particle size of (A) [μm] | — | 0.15 | 0.15 | 0.3 |
| Resin (b) | (b-1) + (b-2) | (b-1) + (b-2) | (b-1) + (b-2) | (b-1) + (b-2) |
| Composition of (b) | Polyester | Polyester | Polyester | Polyester |
| Weight ratio between (a) and (b) | — | 15:85 | 5:95 | 15:85 |
| SP value of solvent (S) | 11.8 | 11.8 | — | — |
| Insoluble content to (S) (% by weight) | 0.1 or less | 0.1 or less | — | — |
| Resin solution (L) | L-1 | L-1 | L-1 | — |
| Solvent (S) | S-1 | S-1 | S-1 | — |
| Dispersion stabilizer (E) | — | — | — | — |
| Resin particle (C) | C-1' | C-2' | C-3' | C-4' |

TABLE 4

|  | Example |  |  |  |  |  |  |  |  |  |
|---|---|---|---|---|---|---|---|---|---|---|
|  | 1 | 2 | 3 | 4 | 5 | 6 | 7 | 8 | 9 | 10 |
| Volume average particle size of (C) [μm] | 6 | 5 | 5 | 5 | 5 | 5 | 5 | 5 | 4 | 5 |
| Volume average particle size/number average particle size of (C) | 1.2 | 1.2 | 1.25 | 1.25 | 1.2 | 1.2 | 1.2 | 1.2 | 1.15 | 1.2 |
| Volume average particle size ratio of (A)/(C) | 0.067 | 0.060 | 0.060 | 0.060 | 0.060 | 0.060 | 0.060 | 0.080 | 0.038 | 0.030 |
| Shape | Spherical | Spherical | Spherical | Spherical | Spherical | Spherical | Spherical | Spherical | Spherical | Spherical |
| Heat resistant keeping property | Good | Good | Good | Good | Good | Good | Good | Good | Good | Good |
| Humidity and heat resistant keeping property | Good | Good | Good | Good | Good | Good | Good | Good | Good | Good |
| Low temperature fixing temperature (° C.) | 120 | 125 | 125 | 120 | 125 | 125 | 120 | 125 | 160 | 160 |
| Surface wettability (solubility parameter) | 18 | 18 | 18 | 18 | 18 | 18 | 18 | 18 | 18 | 18 |

TABLE 5

|  | Example |  |  |  |  |  |  |  |  |  |
|---|---|---|---|---|---|---|---|---|---|---|
|  | 11 | 12 | 13 | 14 | 15 | 16 | 17 | 18 | 19 | 20 |
| Volume average particle size of (C) [μm] | 4 | 3 | 5 | 5 | 6 | 7 | 7 | 8 | 9 | 5 |

TABLE 5-continued

| | Example 11 | 12 | 13 | 14 | 15 | 16 | 17 | 18 | 19 | 20 |
|---|---|---|---|---|---|---|---|---|---|---|
| Volume average particle size/number average particle size of (C) | 1.2 | 1.2 | 1.25 | 1.15 | 1.2 | 1.2 | 1.25 | 1.2 | 1.3 | 1.2 |
| Volume average particle size ratio of (A)/(C) | 0.075 | 0.100 | 0.060 | 0.060 | 0.050 | 0.043 | 0.043 | 0.025 | 0.044 | 0.003 |
| Shape | Spherical | Spherical | Spherical | Spherical | Spherical | Spherical | Spherical | Spherical | Spherical | Spherical |
| Heat resistant keeping property | Good | Good | Good | Good | Good | Good | Good | Good | Good | Good |
| Humidity and heat resistant keeping property | Good | Good | Good | Good | Good | Good | Good | Good | Good | Acceptable |
| Low temperature fixing temperature (° C.) | 110 | 115 | 110 | 120 | 120 | 125 | 120 | 125 | 130 | 150 |
| Surface wettability (solubility parameter) | 18 | 18 | 18 | 18 | 18 | 18 | 18 | 18 | 18 | 23 |

| | Comparative Example 1 | 2 | 3 | 4 |
|---|---|---|---|---|
| Volume average particle size of (C) [μm] | 45 | 5 | 5 | >100 |
| Volume average particle size of/number average particle size of (C) | >1.5 | >1.5 | 1.2 | >1.5 |
| Volume average particle size ratio of (A)/(C) | — | 0.006 | 0.003 | — |
| Shape | Amorphous | Amorphous | Spherical | Amorphous |
| Heat resistant keeping property | Unevaluable | Unevaluable | Acceptable | Unevaluable |
| Humidity and heat resistant keeping property | Unevaluable | Unevaluable | Poor | Unevaluable |
| Low temperature fixing temperature (° C.) | Unevaluable | Unevaluable | 145 | Unevaluable |
| Surface wettability (solubility parameter) | Unevaluable | Unevaluable | 25 | Unevaluable |

While the resin particles obtained in Examples 1 to 20 showed small volume average particle size/number average particle size, and had a sharp particle size distribution, the resin particles obtained in Comparative Examples 1, 2, and 4 aggregated to lead to significant impairment of the particle size distribution. Further, while the resin particles obtained in Examples 1 to 20 were excellent in humidity and heat resistant keeping property, the resin particles obtained in Comparative Example 3 were poor in humidity and heat resistant keeping property. Further, the resin particles obtained in Examples 1 to 8, and 11 to 19 also had the effect that they exhibit an excellent low temperature fixing property (the low temperature fixing temperature is low) when used as toner for electrophotography.

INDUSTRIAL APPLICABILITY

The resin particles of the present invention are very useful as electrophotographic toner. Also they are useful as an additive for paints, an additive for cosmetics, an additive for paper coating, a resin for slush molding, a powdery paint, a spacer for production of electronic components, a standard particle for electronic measuring devices, a particle for electronic paper, a carrier for medical diagnosis, a particle for electric viscosity, and resin particles for other molding applications.

The invention claimed is:

1. A resin particle (C) comprising a microparticle (A) fixed to or formed as a film on a surface of a resin particle (B) containing a resin (b),
wherein the degree of swelling of the microparticle (A) by liquid or supercritical carbon dioxide (X) at a temperature lower than the glass transition temperature or the melting point of the microparticle (A) is 16% or less, and the microparticle (A) is made of a crystalline resin (a1),
wherein the crystalline resin (a1) is at least one kind selected from the group consisting of the following (a11) to (a14):
(a11) a crystalline polyester containing a straight-chain aliphatic diol having an alkylene chain with 2 to 50 carbon atoms and a straight-chain aliphatic dicarboxylic acid having an alkylene chain with 2 to 50 carbon atoms as essential constitutional units, wherein the total number of the number of carbon atoms in the alkylene chain of the diol and the number of carbon atoms in the alkylene chain of the dicarboxylic acid is 12 to 52, and further containing an aromatic dicarboxylic acid with 6 to 30 carbon atoms as a constitutional unit as necessary,
(a12) a crystalline polyurethane and/or polyurea containing a straight-chain aliphatic diol having an alkylene chain with 2 to 50 carbon atoms and/or a straight-chain aliphatic diamine having an alkylene chain with 2 to 50 carbon atoms, and a straight-chain aliphatic diisocyanate having an alkylene chain with 2 to 50 carbon atoms as essential constitutional units, and has the total number of the average number of carbon atoms in the alkylene chain of the diol and/or the diamine, and the number of carbon atoms in the alkylene chain of the diisocyanate of 10 to 52,
(a13) a crystalline vinyl resin containing an alkyl (meth)acrylate having 12 to 50 carbon atoms in the alkyl group as an essential constitutional unit, and
(a14) a crystalline vinyl resin containing (meth)acrylonitrile and a crystalline vinyl monomer as essential constitutional units.

2. The resin particle according to claim 1, wherein the melting point of the crystalline resin (a1) is 50 to 110° C.

3. The resin particle according to claim 1, wherein a surface-active substance having a hydrophilic group is not substantially contained.

4. A resin particle for electrophotographic toner containing the resin particle according to claim 1.

5. An electrophotographic toner containing the resin particle for electrophotographic toner according to claim 4.

6. The electrophotographic toner according to claim 5, wherein the resin particle for electrophotographic toner is further added with an external additive.

7. A method for producing the resin particle (C) according to claim 1, comprising the steps of: dispersing a precursor (b0) of the resin (b) in liquid or supercritical carbon dioxide (X) in which the microparticle (A) is dispersed;
reacting the precursor (b0) into the resin (b); and
removing the liquid or supercritical carbon dioxide (X) to obtain the resin particle (C).

8. The production method according to claim 7, wherein in the dispersing step in the liquid or supercritical carbon dioxide (X), a dispersion stabilizer (E) having at least one of a dimethylsiloxane group and a fluorine-containing functional group is used.

9. A method for producing the resin particle (C) according to claim 1, comprising the steps of: dispersing a solution (L) dissolving the resin (b) in a solvent (S), in liquid or supercritical carbon dioxide (X) in which the microparticle (A) is dispersed;
forming a resin particle (C1) in which a microparticle (A) is fixed to a surface of a resin particle (B1) containing the resin (b) and the solvent (S); and
removing the liquid or supercritical carbon dioxide (X) and the solvent (S) from the resin particle (C1) to obtain the resin particle (C).

10. The production method according to claim 9, wherein after the resin particle (C1) is formed, the liquid or supercritical carbon dioxide (X) containing the solvent (S) is replaced with carbon dioxide not containing the solvent (S) so as to remove or reduce the solvent (S) contained in (C1), and then carbon dioxide is removed by reducing the pressure.

11. The production method according to claim 9, wherein the weight of an insoluble content of the resin (b) or the precursor (b0) in an equivalent weight mixture of the solvent (S), and the resin (b) or the precursor (b0) in a normal condition of 23° C. and 0.1 MPa is 20% by weight or less relative to the weight of the resin (b) or the precursor (b0), and the solubility parameter of the solvent (S) is 9 to 16.

12. The production method according to claim 9, wherein the solvent (S) is a cyclic ether, a pyruvic acid ester, an ethylene glycol monoalkyl ether, a propylene glycol monoalkyl ether, a 2-hydroxyisobutyric acid ester, a lactic acid ester, a fluorine-containing alcohol, a mixed solvent of acetone, methanol and water, a mixed solvent of acetone and methanol, a mixed solvent of acetone and ethanol, a mixed solvent of acetone and water, or a mixed solvent of methyl ethyl ketone and water.

13. The production method according to claim 9, wherein in the dispersing step in the liquid or supercritical carbon dioxide (X), a dispersion stabilizer (E) having at least one of a dimethylsiloxane group and a fluorine-containing functional group is used.

14. A method for producing the resin particle (C) according to claim 1, comprising the steps of:
dispersing a solution (L0) dissolving a precursor (b0) of the resin (b) in a solvent (S), in liquid or supercritical carbon dioxide (X) in which the microparticle (A) is dispersed,
reacting the precursor (b0) into the resin (b);
forming a resin particle (C1) in which the microparticle (A) is fixed to a surface of a resin particle (B1) containing the resin (b) and the solvent (S); and
removing the liquid or supercritical carbon dioxide (X) and the solvent (S) from the resin particle (C1) to obtain the resin particle (C).

15. The production method according to claim 14, wherein after the resin particle (C1) is formed, the liquid or supercritical carbon dioxide (X) containing the solvent (S) is replaced with carbon dioxide not containing the solvent (S) so as to remove or reduce the solvent (S) contained in (C1), and then carbon dioxide is removed by reducing the pressure.

16. The production method according to claim 14, wherein the weight of an insoluble content of the resin (b) or the precursor (b0) in an equivalent weight mixture of the solvent (S), and the resin (b) or the precursor (b0) in a normal condition of 23° C. and 0.1 MPa is 20% by weight or less relative to the weight of the resin (b) or the precursor (b0), and the solubility parameter of the solvent (S) is 9 to 16.

17. The production method according to claim 14, wherein the solvent (S) is a cyclic ether, a pyruvic acid ester, an ethylene glycol monoalkyl ether, a propylene glycol monoalkyl ether, a 2-hydroxyisobutyric acid ester, a lactic acid ester, a fluorine-containing alcohol, a mixed solvent of acetone, methanol and water, a mixed solvent of acetone and methanol, a mixed solvent of acetone and ethanol, a mixed solvent of acetone and water, or a mixed solvent of methyl ethyl ketone and water.

18. The production method according to claim 14, wherein in the dispersing step in the liquid or supercritical carbon dioxide (X), a dispersion stabilizer (E) having at least one of a dimethylsiloxane group and a fluorine-containing functional group is used.

* * * * *